United States Patent
Ogawa et al.

(10) Patent No.: US 10,862,703 B2
(45) Date of Patent: Dec. 8, 2020

(54) IN-VEHICLE COMMUNICATION SYSTEM, SWITCH DEVICE, AND COMMUNICATION CONTROL METHOD

(71) Applicants: Sumitomo Electric Industries, Ltd., Osaka (JP); AutoNetworks Technologies, Ltd., Yokkaichi (JP); Sumitomo Wiring Systems, Ltd., Yokkaichi (JP)

(72) Inventors: Akihiro Ogawa, Osaka (JP); Hirofumi Urayama, Osaka (JP); Koichi Takayama, Osaka (JP); Takeshi Hagihara, Yokkaichi (JP); Yasuhiro Yabuuchi, Yokkaichi (JP)

(73) Assignees: Sumitomo Electric Industries, Ltd., Osaka (JP); AutoNetworks Technologies, Ltd., Yokkaichi (JP); Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 16/621,779

(22) PCT Filed: Mar. 20, 2018

(86) PCT No.: PCT/JP2018/011094
§ 371 (c)(1),
(2) Date: Dec. 12, 2019

(87) PCT Pub. No.: WO2018/230070
PCT Pub. Date: Dec. 20, 2018

(65) Prior Publication Data
US 2020/0153655 A1  May 14, 2020

(30) Foreign Application Priority Data
Jun. 14, 2017 (JP) .................. 2017-116856

(51) Int. Cl.
*G06F 15/16* (2006.01)
*H04L 12/40* (2006.01)
(Continued)

(52) U.S. Cl.
CPC ........ *H04L 12/40176* (2013.01); *H04L 12/44* (2013.01); *H04L 12/66* (2013.01);
(Continued)

(58) Field of Classification Search
CPC ... H04L 12/40176; H04L 12/44; H04L 12/66; H04L 63/101; H04L 2012/40273; H04W 4/40
(Continued)

(56) References Cited

U.S. PATENT DOCUMENTS 6,424,119 B1 * 7/2002 Nelson .................. H02J 7/0013
320/116
7,549,081 B2 * 6/2009 Robbins .............. G06F 11/2051
714/10
(Continued)

FOREIGN PATENT DOCUMENTS

| JP | 2001-127801 A | 5/2001 |
| JP | 2003-258877 A | 9/2003 |

(Continued)

*Primary Examiner* — Moustafa M Meky
(74) *Attorney, Agent, or Firm* — Baker Botts L.L.P.; Michael A. Sartori

(57) ABSTRACT

An in-vehicle communication system includes first and second switch devices that perform a relay process of relaying data in an in-vehicle network, the first switch device includes a switch unit and a processing unit that performs the relay process via the switch unit, the switch unit transmits target data to the second switch device instead of outputting (Continued)

the target data to the processing unit when an abnormality in the processing unit is detected, the target data being data which is received from a device other than the second switch device and is to undergo the relay process performed by the processing unit, and the second switch device performs a proxy process of relaying the target data received from the switch unit instead of the processing unit.

12 Claims, 16 Drawing Sheets

(51) Int. Cl.

| | | |
|---|---|---|
| *H04W 4/40* | (2018.01) | |
| *H04L 12/44* | (2006.01) | |
| *H04L 12/66* | (2006.01) | |
| *H04L 29/06* | (2006.01) | |
| *H04W 80/02* | (2009.01) | |

(52) U.S. Cl.
CPC ............. *H04L 63/101* (2013.01); *H04W 4/40* (2018.02); *H04W 80/02* (2013.01); *H04L 2012/40273* (2013.01); *H04L 2012/445* (2013.01)

(58) Field of Classification Search
USPC ........................................................ 709/217
See application file for complete search history.

(56) References Cited

U.S. PATENT DOCUMENTS

| | | | | |
|---|---|---|---|---|
| 8,008,892 | B2* | 8/2011 | Kikuchi | ................. G03G 15/80 320/134 |
| 8,305,879 | B2* | 11/2012 | Gregg | ................. G06F 11/2094 370/217 |
| 8,797,042 | B2* | 8/2014 | Ike | ......................... G01R 31/52 324/509 |
| 9,112,376 | B2* | 8/2015 | Wang | ...................... H02J 9/062 |
| 9,419,532 | B2* | 8/2016 | Hirano | ............. H02M 3/33576 |
| 9,628,065 | B2* | 4/2017 | Law | ..................... H03K 17/002 |
| 2003/0052644 | A1* | 3/2003 | Nelson | ...................... H02J 9/06 320/107 |
| 2019/0222599 | A1* | 7/2019 | Inoue | ................. H04L 63/1425 |

FOREIGN PATENT DOCUMENTS

| | | |
|---|---|---|
| JP | 2015-088815 A | 5/2015 |
| JP | 2016-012932 A | 1/2016 |

* cited by examiner

FIG. 2

| DEVICE | VID | MAC ADDRESS | IP ADDRESS |
|---|---|---|---|
| SWITCH DEVICE 101A | 1, 2 | MAC-A | IP-A |
| IN-VEHICLE COMMUNICATION DEVICE 111B | 1 | MAC-B | IP-B |
| IN-VEHICLE COMMUNICATION DEVICE 111C | 1 | MAC-C | IP-C |
| IN-VEHICLE COMMUNICATION DEVICE 111D | 2 | MAC-D | IP-D |
| IN-VEHICLE COMMUNICATION DEVICE 111E | 2 | MAC-E | IP-E |
| IN-VEHICLE COMMUNICATION DEVICE 111F | 2 | MAC-F | IP-F |
| SWITCH DEVICE 101B | 1, 2 | MAC-G | IP-G |

F I G . 12
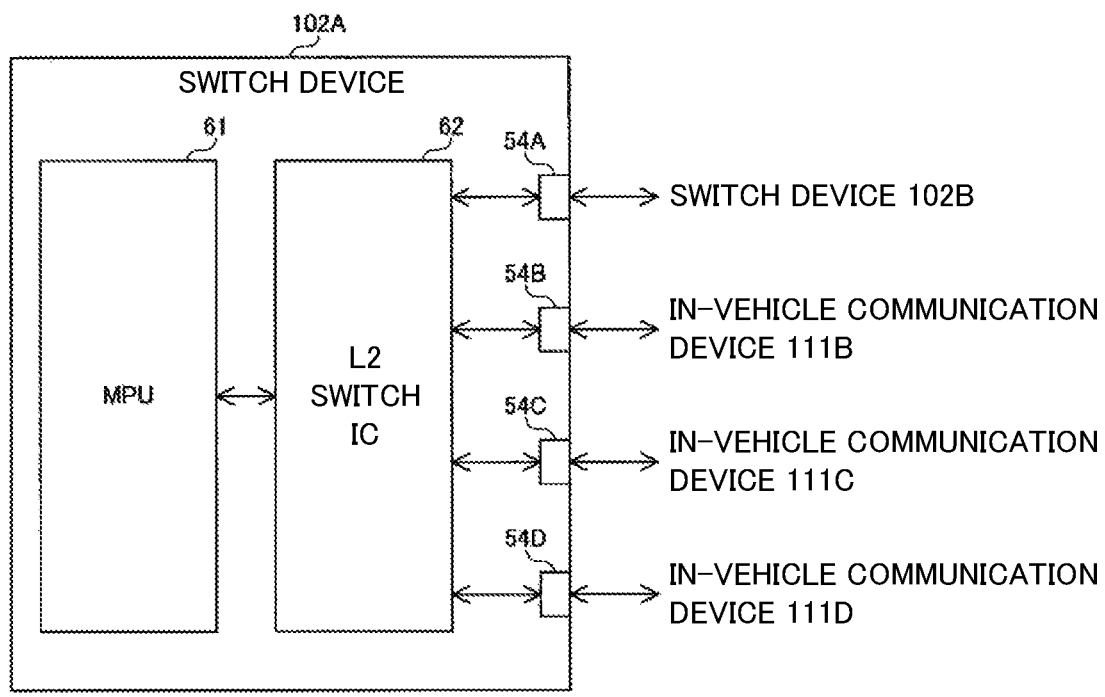

F I G . 14
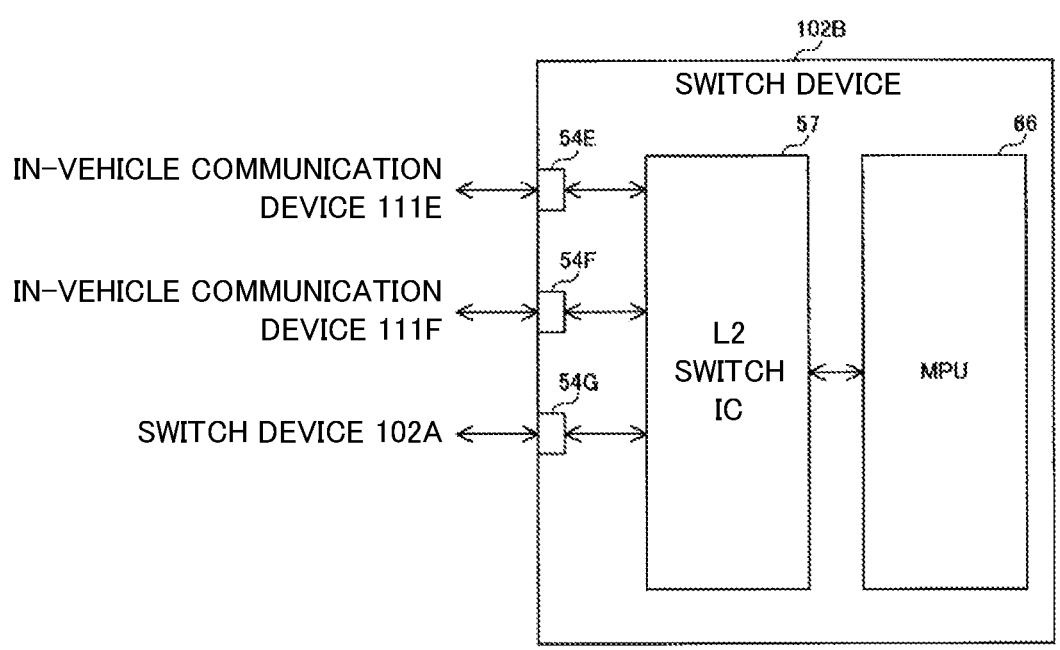

IN-VEHICLE COMMUNICATION SYSTEM, SWITCH DEVICE, AND COMMUNICATION CONTROL METHOD

CROSS-REFERENCE TO RELATED APPLICATIONS

This application is the national phase under 35 U.S.C. § 371 of PCT International Application No. PCT/JP2018/011094 which has an International filing date of Mar. 20, 2018 and designated the United States of America.

FIELD

The present disclosure relates to an in-vehicle communication system, a switch device, a communication control method, and a communication control program.

This application claims the benefit of Japanese Patent Application No. 2017-116856 filed on Jun. 14, 2017, the entire contents of which are incorporated herein by reference.

BACKGROUND

The following station side device is disclosed in Patent Document 1 (Japanese Patent Laid-Open Publication No. 2016-12932). That is, a station side device includes operating system (currently used) OSUs 1 to N, a standby system (spare) OSU N+1, and a control unit. The control unit transfers management information of an ONU linked to a logical line with a network management system (NMS). The logical line is defined by a fixed combination of an optical line unit and a passive optical network.

On the other hand, the OSU acquires the management information linked to the physical line. The physical line indicates an actual combination of the optical line unit and the passive optical network. The control unit converts a line linked to the management information between the logical line and the physical line using mapping information.

SUMMARY (1) An in-vehicle communication system of the present disclosure includes first and second switch devices that perform a relay process of relaying data in an in-vehicle network, the first switch device including a switch unit and a processing unit that performs the relay process via the switch unit, in which the switch unit transmits target data to the second switch device instead of outputting the target data to the processing unit when an abnormality in the processing unit is detected, the target data being data which is received from a device other than the second switch device and is to undergo the relay process performed by the processing unit, and the second switch device performs a proxy process of relaying the target data received from the switch unit instead of the processing unit.

(8) A switch device of the present disclosure is a switch device in an in-vehicle communication system including a plurality of switch devices performing a relay process of relaying data in an in-vehicle network, and includes a switch unit and a processing unit that performs the relay process via the switch unit, in which the switch unit transmits target data to another switch device instead of outputting the target data to the processing unit when an abnormality in the processing unit is detected, the target data being data which is received from a device other than the other switch device and is to undergo the relay process performed by the processing unit.

(9) A switch device of the present disclosure is a switch device in an in-vehicle communication system including a plurality of switch devices performing a relay process of relaying data in an in-vehicle network, and includes a switch unit and a processing unit that performs the relay process via the switch unit, in which the processing unit performs a proxy process of relaying target data received by the switch unit instead of the processing unit in another switch device when the switch unit receives the target data from the other switch device, the target data being data to undergo the relay process performed by the processing unit in which an abnormality is detected in the other switch device.

(10) A communication control method of the present disclosure is a communication control method in an in-vehicle communication system including first and second switch devices that perform a relay process of relaying data in an in-vehicle network, the first switch device including a switch unit and a processing unit that performs the relay process via the switch unit, and includes a step of transmitting, by the switch unit, target data to the second switch device instead of outputting the target data to the processing unit when an abnormality in the processing unit is detected, the target data being data which is received from a device other than the second switch device and is to undergo the relay process performed by the processing unit, and a step of performing, by the second switch device, a proxy process of relaying the target data received from the switch unit instead of the processing unit.

(11) A communication control method of the present disclosure is a communication control method in a switch device in an in-vehicle communication system including a plurality of switch devices performing a relay process of relaying data in an in-vehicle network, each of the switch device including a switch unit and a processing unit, and includes a step of performing the relay process via the switch unit and a step of transmitting target data to another switch device instead of outputting the target data to the processing unit when an abnormality in the processing unit is detected, the target data being data which is received from a device other than the other switch device and is to undergo the relay process performed by the processing unit.

(12) A communication control method of the present disclosure is a communication control method in a switch device in an in-vehicle communication system including a plurality of switch devices performing a relay process of relaying data in an in-vehicle network, each of the switch device including a switch unit and a processing unit, and includes a step of performing the relay process via the switch unit and a step of performing a proxy process of relaying target data received by the switch unit instead of the processing unit in another switch device when the switch unit receives the target data from the other switch device, the target data being data to undergo the relay process performed by the processing unit in which an abnormality is detected in the other switch device.

(13) A communication control program of the present disclosure is a communication control program used in a switch device in an in-vehicle communication system including a plurality of switch devices performing a relay process of relaying data in an in-vehicle network, the communication control program causing a computer to function as a switch unit; and a processing unit that performs the relay process via the switch unit, in which the switch unit transmits target data to another switch device instead of outputting the target data to the processing unit when an abnormality in the processing unit is detected, the target data being data which is received from a device other than the other switch device and is to undergo the relay process performed by the processing unit.

(14) A communication control program of the present disclosure is a communication control program used in a switch device in an in-vehicle communication system including a plurality of switch devices performing a relay process of relaying data in an in-vehicle network, the communication control program causing a computer to function as a switch unit and a processing unit that performs the relay process via the switch unit, in which the processing unit performs a proxy process of relaying target data received by the switch unit instead of the processing unit in another switch device when the switch unit receives the target data from the other switch device, the target data being data to undergo the relay process performed by the processing unit in which an abnormality is detected in the other switch device.

One aspect of the present disclosure may be realized as a semiconductor integrated circuit that realizes a part or all of an in-vehicle communication system.

Further, one aspect of the present disclosure can be realized as a semiconductor integrated circuit that realizes a part or all of a switch device.

The above and further objects and features will more fully be apparent from the following detailed description with accompanying drawings.

BRIEF DESCRIPTION OF THE DRAWINGS

FIG. 2 is a diagram illustrating an example of a VID, a MAC address, and an IP address of each device in the in-vehicle communication system according to the first embodiment of the present disclosure.

FIG. 12 is a diagram illustrating a configuration of a switch device in the in-vehicle communication system according to the second embodiment of the present disclosure.

FIG. 14 is a diagram illustrating a configuration of a switch device in the in-vehicle communication system according to the second embodiment of the present disclosure.

DETAILED DESCRIPTION

Figure 1:
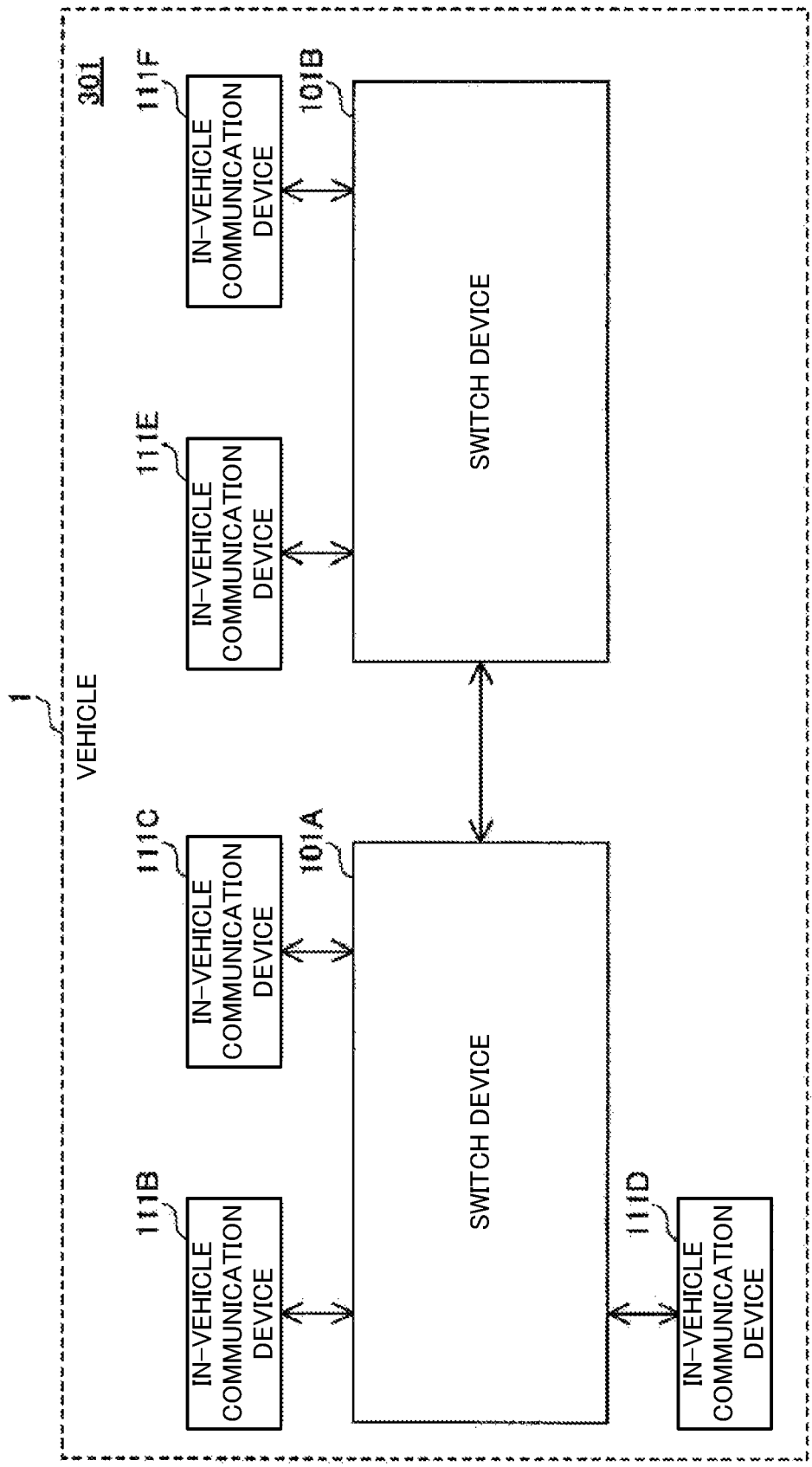
FIG. 1 is a diagram illustrating a configuration of an in-vehicle communication system according to a first embodiment of the present disclosure.

In the past, in order to provide high-quality services, a technique for performing system duplexing (redundancy) has been developed.

In an in-vehicle network in which a plurality of functional units are disposed, there are cases in which a switch device that relays data which is transmitted and received between functional units is disposed. If the relay circuit that relays data in this switch device has a failure, data relaying between the functional units is not performed normally. Although a technique of performing data transmission in the in-vehicle network more stably due to system redundancy is desirable, such redundancy is not disclosed in Patent Document 1.

The present disclosure was made to solve the above-described problems, and it is an object of the present disclosure to realize an in-vehicle communication system, a switch device, a communication control method, and a communication control program which are capable of realizing more stable data transmission in an in-vehicle network.

According to the present disclosure, the more stable data transmission can be realized in the in-vehicle network.

First, exemplary embodiments of the present disclosure will be described.

(1) An in-vehicle communication system according to an embodiment of the present disclosure includes first and second switch devices that perform a relay process of relaying data in an in-vehicle network, the first switch device including a switch unit and a processing unit that performs the relay process via the switch unit, in which the switch unit transmits target data to the second switch device instead of outputting the target data to the processing unit when an abnormality in the processing unit is detected, the target data being data which is received from a device other than the second switch device and is to undergo the relay process performed by the processing unit, and the second switch device performs a proxy process of relaying the target data received from the switch unit instead of the processing unit.

As described above, for example, with the configuration in which the second switch device performs the relay process by proxy in the situation in which the processing unit in the first switch device has a failure and is unable to perform the relay process via the switch unit, it is possible to prevent a situation in which the data is not normally relayed between the functional units since because the target data is not relayed in the in-vehicle network. Therefore, the more stable data transmission can be realized in the in-vehicle network.

(2) Preferably, the switch unit is able to detect the abnormality in the processing unit, and transmits predetermined information to the second switch device when the abnormality is detected, and the second switch device receives the predetermined information from the switch unit and performs the proxy process.

As described above, with the configuration in which the switch unit operating in conjunction with the processing unit detects the abnormality in the processing unit, it is possible to detect the abnormality in the processing unit more correctly, and thus it is possible to prevent a situation in which the second switch device is caused to perform the proxy process even though the processing unit is normal.

(3) Preferably, the second switch device is able to detect the abnormality in the processing unit on the basis of a presence or absence of reception of predetermined information from the processing unit, and transmits a predetermined information to the switch unit and performs the proxy process when the abnormality is detected.

With such a configuration, the second switch device can remotely detect the abnormality in the processing unit and perform the proxy process.

(4) Preferably, the first switch device and the second switch device are able to perform the relay process in accordance with a first layer and a second layer higher than the first layer, the second switch device holds first table information indicating a correspondence relation between an Internet protocol (IP) address and a media access control (MAC) address used in the relay process of the second layer in the second switch device and second table information indicating a correspondence relation between an IP address and a MAC address used in the relay process of the second layer in the second switch device and the first switch device, and the second switch device uses the second table information instead of the first table information in the proxy process.

With the configuration in which the relay process of the second layer is performed using the second table information prepared in advance when the abnormality in the processing unit is detected as described above, the abnormality in the processing unit is detected, and thus the relay process of the second layer can be started earlier than, for example, in the configuration in which the second table information is generated using a predetermined protocol.

(5) Preferably, when the proxy process is started, the second switch device changes content of data control in the relay process from data control before the proxy process is started.

With such a configuration, for example, the second switch device can perform the data control to be performed by the first switch device by proxy after the abnormality in the processing unit is detected.

(6) More preferably, the data control is data filtering.

With such a configuration, for example, the second switch device can perform the data filtering to be performed by the first switch device by proxy after the abnormality in the processing unit is detected, and thus unauthorized data can be prevented from being transmitted in the in-vehicle communication system.

(7) Preferably, the switch unit restricts a transmission rate of the target data to the second switch device when the abnormality in the processing unit is detected.

With such a configuration, the bit rate of the target data received by the second switch device can be lowered, and thus the relay process load in the second switch device can be prevented from being excessively increased.

(8) A switch device according to an embodiment of the present disclosure is a switch device in an in-vehicle communication system including a plurality of switch devices performing a relay process of relaying data in an in-vehicle network, and includes a switch unit and a processing unit that performs the relay process via the switch unit, in which the switch unit transmits target data to another switch device instead of outputting the target data to the processing unit when an abnormality in the processing unit is detected, the target data being data which is received from a device other than the other switch device and is to undergo the relay process performed by the processing unit.

With the configuration in which the target data is transmitted to another switch device instead of outputting the target data to the processing unit in a situation in which the processing unit has a failure, and the relay process via the switch unit is unable to be performed, it is possible to cause the target data relay process to be performed in another switch device by proxy, and thus it is possible to prevent a situation in which the data is not normally relayed between the functional units since the target data is not relayed in the in-vehicle network. Therefore, the more stable data transmission can be realized in the in-vehicle network.

(9) A switch device according to an embodiment of the present disclosure is a switch device in an in-vehicle communication system including a plurality of switch devices performing a relay process of relaying data in an in-vehicle network, and includes a switch unit and a processing unit that performs the relay process via the switch unit, in which the processing unit performs a proxy process of relaying target data received by the switch unit instead of the processing unit in another switch device when the switch unit receives the target data from the other switch device, the target data being data to undergo the relay process performed by the processing unit in which an abnormality is detected in the other switch device.

As described above, for example, with the configuration in which the processing unit performs the relay process by proxy instead of the processing unit in another switch device in the situation in which the processing unit in another switch device has a failure, and the relay process to be performed by the processing unit in another switch device is unable to be performed, it is possible to prevent a situation in which the data is not normally relayed between the functional units since because the target data is not relayed in the in-vehicle network. Therefore, the more stable data transmission can be realized in the in-vehicle network.

(10) A communication control method according to an embodiment of the present disclosure is a communication control method in an in-vehicle communication system including first and second switch devices that perform a relay process of relaying data in an in-vehicle network, the first switch device including a switch unit and a processing unit that performs the relay process via the switch unit, and includes a step of transmitting, by the switch unit, target data to the second switch device instead of outputting the target data to the processing unit when an abnormality in the processing unit is detected, the target data being data which is received from a device other than the second switch device and is to undergo the relay process performed by the processing unit, and a step of performing, by the second switch device, a proxy process of relaying the target data received from the switch unit instead of the processing unit.

As described above, for example, with the configuration in which the second switch device performs the relay process by proxy in the situation in which the processing unit in the first switch device has a failure and is unable to perform the relay process via the switch unit, it is possible to prevent a situation in which the data is not normally relayed between the functional units since because the target data is not relayed in the in-vehicle network. Therefore, the more stable data transmission can be realized in the in-vehicle network.

(11) A communication control method according to an embodiment of the present disclosure is a communication control method in a switch device in an in-vehicle communication system including a plurality of switch devices performing a relay process of relaying data in an in-vehicle network, each of the switch device including a switch unit and a processing unit, and includes a step of performing the relay process via the switch unit and a step of transmitting target data to another switch device instead of outputting the target data to the processing unit when an abnormality in the processing unit is detected, the target data being data which is received from a device other than the other switch device and is to undergo the relay process performed by the processing unit.

With the configuration in which the target data is transmitted to another switch device instead of outputting the target data to the processing unit in a situation in which the processing unit has a failure, and the relay process via the switch unit is unable to be performed, it is possible to cause the target data relay process to be performed in another switch device by proxy, and thus it is possible to prevent a situation in which the data is not normally relayed between the functional units since the target data is not relayed in the in-vehicle network. Therefore, the more stable data transmission can be realized in the in-vehicle network.

(12) A communication control method according to an embodiment of the present disclosure is a communication control method in a switch device in an in-vehicle communication system including a plurality of switch devices performing a relay process of relaying data in an in-vehicle network, each of the switch device including a switch unit and a processing unit, and includes a step of performing the relay process via the switch unit and a step of performing a proxy process of relaying target data received by the switch unit instead of the processing unit in another switch device when the switch unit receives the target data from the other switch device, the target data being data to undergo the relay process performed by the processing unit in which an abnormality is detected in the other switch device.

As described above, for example, with the configuration in which the processing unit performs the relay process by proxy instead of the processing unit in another switch device in the situation in which the processing unit in another switch device has a failure, and the relay process to be performed by the processing unit in another switch device is unable to be performed, it is possible to prevent a situation in which the data is not normally relayed between the functional units since because the target data is not relayed in the in-vehicle network. Therefore, the more stable data transmission can be realized in the in-vehicle network.

(13) A communication control program according to an embodiment of the present disclosure is a communication control program used in a switch device in an in-vehicle communication system including a plurality of switch devices performing a relay process of relaying data in an in-vehicle network, the communication control program causing a computer to function as a switch unit; and a processing unit that performs the relay process via the switch unit, in which the switch unit transmits target data to another switch device instead of outputting the target data to the processing unit when an abnormality in the processing unit is detected, the target data being data which is received from a device other than the other switch device and is to undergo the relay process performed by the processing unit.

With the configuration in which the target data is transmitted to another switch device instead of outputting the target data to the processing unit in a situation in which the processing unit has a failure, and the relay process via the switch unit is unable to be performed, it is possible to cause the target data relay process to be performed in another switch device by proxy, and thus it is possible to prevent a situation in which the data is not normally relayed between the functional units since the target data is not relayed in the in-vehicle network. Therefore, the more stable data transmission can be realized in the in-vehicle network.

(14) A communication control program according to an embodiment of the present disclosure is a communication control program used in a switch device in an in-vehicle communication system including a plurality of switch devices performing a relay process of relaying data in an in-vehicle network, the communication control program causing a computer to function as a switch unit and a processing unit that performs the relay process via the switch unit, in which the processing unit performs a proxy process of relaying target data received by the switch unit instead of the processing unit in another switch device when the switch unit receives the target data from the other switch device, the target data being data to undergo the relay process performed by the processing unit in which an abnormality is detected in the other switch device.

As described above, for example, with the configuration in which the processing unit performs the relay process by proxy instead of the processing unit in another switch device in the situation in which the processing unit in another switch device has a failure, and the relay process to be performed by the processing unit in another switch device is unable to be performed, it is possible to prevent a situation in which the data is not normally relayed between the functional units since because the target data is not relayed in the in-vehicle network. Therefore, the more stable data transmission can be realized in the in-vehicle network.

Hereinafter, exemplary embodiments of the present disclosure will be described with reference to the appended drawings. In the drawings, the same or corresponding parts are denoted by the same reference numerals and description thereof will not be repeated. Also, some of embodiments to be described below may be arbitrarily combined.

First Embodiment

[Configuration and Basic Operation]
FIG. 1 is a diagram illustrating a configuration of an in-vehicle communication system according to a first embodiment of the present disclosure.

Referring to FIG. 1, an in-vehicle communication system 301 includes a switch device 101A (first switch device), switch device 101B (second switch device), and in-vehicle communication devices 111B, 111C, 111D, 111E, and 111F. The in-vehicle communication system 301 is installed in a vehicle 1.

Hereinafter, each of the switch devices 101A and 101B is also referred to as a switch device 101. Also, each of the in-vehicle communication devices 111B, 111C, 111D, 111E, and 111F is also referred to as an in-vehicle communication device 111.

The in-vehicle communication system 301 is not limited to the configuration including the five in-vehicle communication devices 111 and may be configured to include two, three, four, or six, or more in-vehicle communication devices 111.

The in-vehicle communication device 111 is capable of performing communication with, for example, an automated driving electronic control unit (ECU), a sensor, a navigation device, a telematics communication unit (TCU), a central gateway (CGW), a human machine interface, a camera, or the like.

For example, a connection relation of each switch device 101 and each in-vehicle communication device 111 in the in-vehicle network of the vehicle 1 is fixed.

The switch device 101 and the in-vehicle communication device 111 are connected to each other by, for example, a cable for in-vehicle Ethernet (registered trademark) communication (hereinafter referred to as an Ethernet cable).

The switch device 101 and the in-vehicle communication device 111 communicate with each other using an Ethernet cable. Information is exchanged between the switch device 101 and the in-vehicle communication device 111, for example, using an Ethernet frame conforming to IEEE 802.3.

FIG. 2 is a diagram illustrating an example of a VID, a MAC address, and an IP address of each device in the in-vehicle communication system according to the first embodiment of the present disclosure.

Referring to FIG. 2, in the in-vehicle network, for example, the in-vehicle communication devices 111B and 111C and the in-vehicle communication devices 111D, 111E, and 111F belong to different virtual local area networks (VLANs).

In this example, an ID of the VLAN to which the in-vehicle communication devices 111B and 111C belong (hereinafter also referred to as a VID) is 1. Further, a VID to which the in-vehicle communication devices 111D, 111E, and 111F belong is 2.

The switch device 101 and the in-vehicle communication device 111 have unique media access control (MAC) addresses and Internet protocol (IP) addresses.

Referring back to FIG. 1, the switch device 101 performs a relay process of relaying data in the in-vehicle network.

More specifically, the switch device 101 can perform the relay process in accordance with, for example, a layer 2 and a layer 3 higher than the layer 2.

Specifically, in the in-vehicle network, for example, transmission and reception of information are performed using IP packets in accordance with an IP protocol. The IP packets are stored in an Ethernet frame and transmitted.

The switch device 101 relays data in the in-vehicle network. Specifically, the switch device 101 relays the Ethernet frames transmitted between the in-vehicle communication devices 111.

Specifically, the switch device 101 operates in accordance with a communication protocol having a plurality of layers. More specifically, the switch device 101 can function as a layer 2 (L2) switch, and relays the Ethernet frames transmitted between the in-vehicle communication devices 111 belonging to the same VLAN.

The switch device 101 can also function as a layer 3 (L3) relay device, and relays the Ethernet frames between the in-vehicle communication devices 111 belonging to different VLANs.

Specifically, when the in-vehicle communication device 111B transmits an IP packet to the in-vehicle communication device 111C, IP-B and IP-C are included in the IP packet as a transmission source IP address and a transmission destination IP address, respectively.

As the in-vehicle communication device 111B and the in-vehicle communication device 111C belong to the same VLAN, the in-vehicle communication device 111B writes "1," MAC-C, and MAC-B in the Ethernet frame as the VID, the transmission destination MAC address, and the transmission source MAC address.

The in-vehicle communication device 111B transmits the Ethernet frame including the IP packet stored therein to the switch device 101A.

Upon receiving the Ethernet frame from the in-vehicle communication device 111B, the switch device 101A performs the switching process of the layer 2 on the received Ethernet frame and transmits the Ethernet frame to the in-vehicle communication device 111C.

Further, when the in-vehicle communication device 111B transmits the IP packet to the in-vehicle communication device 111D, IP-B and IP-D are included in the IP packet as the transmission source IP address and the transmission destination IP address, respectively.

Since the in-vehicle communication device 111B and the in-vehicle communication device 111D belong to different VLANs, the in-vehicle communication device 111B writes "1" and the MAC address of the switch device 101A which is a default gateway, that is, MAC-A and MAC-B in the Ethernet frame as the VID, the transmission destination MAC address, and the transmission source MAC address, respectively.

The in-vehicle communication device 111B transmits the Ethernet frame including the IP packet stored therein to the switch device 101A.

Upon receiving the Ethernet frame from the in-vehicle communication device 111B, the switch device 101A performs the relay process of the layer 3 on the received Ethernet frame and transmits the Ethernet frame to the in-vehicle communication device 111D.

[Configuration of Switch Device 101A]

Figure 3:
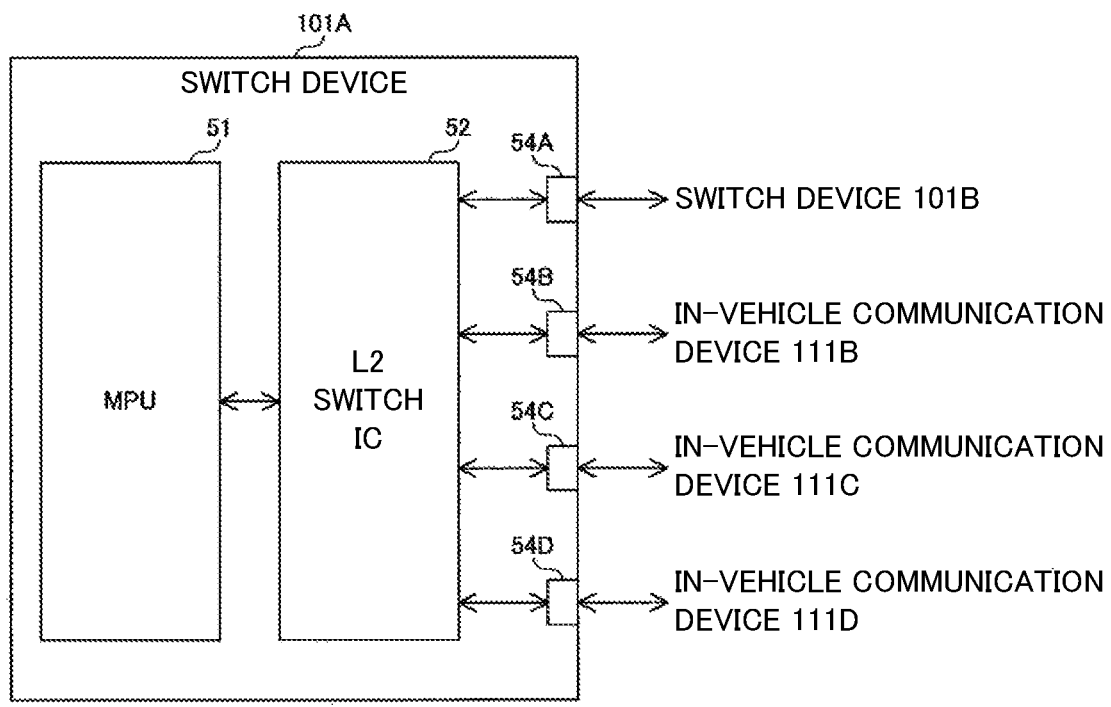
FIG. 3 is a diagram illustrating a configuration of a switch device in the in-vehicle communication system according to the first embodiment of the present disclosure.

FIG. 3 is a diagram illustrating a configuration of the switch device in the in-vehicle communication system according to the first embodiment of the present disclosure.

Referring to FIG. 3, the switch device 101A includes a micro processing unit (MPU) (processing unit) 51, an L2 switch integrated circuit (IC) (switch unit) 52, and four communication ports 54.

The switch device 101A is not limited to the configuration in which the four communication ports 54 are disposed and may have a configuration in which two, three, five, or more communication ports 54 are disposed.

For example, the communication port 54 is a terminal to which an Ethernet cable can be connected. The communication ports 54 can be connected to the in-vehicle communication device 111 and the other switch devices 101 in the vehicle 1.

In this example, the communication ports 54A, 54B, 54C, and 54D are connected to the switch device 101B, the in-vehicle communication device 111B, the in-vehicle communication device 111C, and the in-vehicle communication device 111D via the Ethernet cables, respectively.

Figure 4:
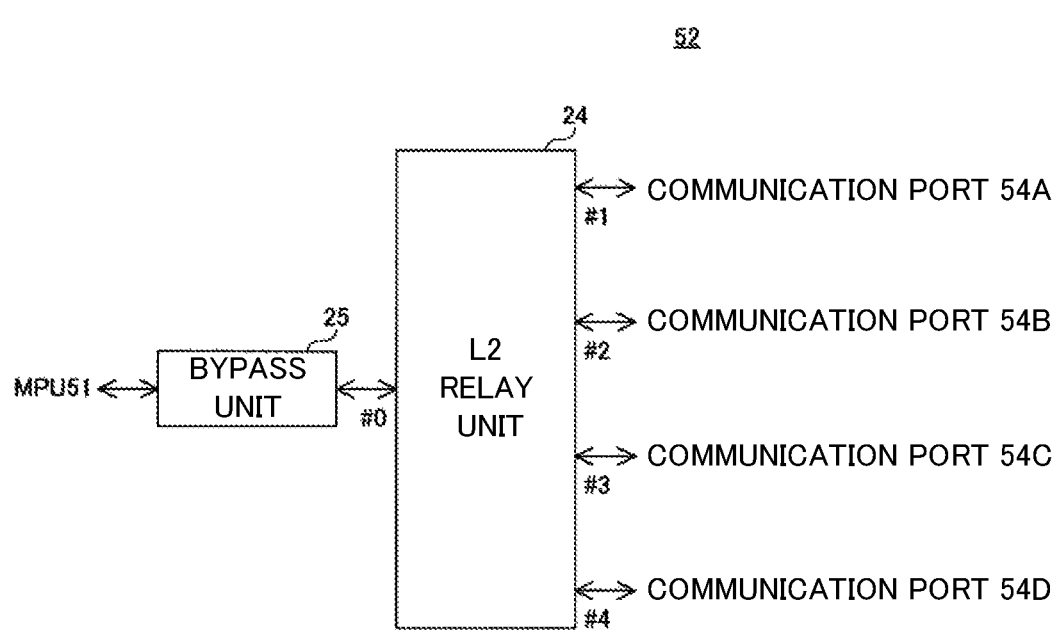
FIG. 4 is a diagram illustrating a configuration of an L2 switch IC in the in-vehicle communication system according to the first embodiment of the present disclosure.

FIG. 4 is a diagram illustrating a configuration of the L2 switch IC in the in-vehicle communication system according to the first embodiment of the present disclosure.

Referring to FIG. 4, the L2 switch IC 52 includes an L2 relay unit 24 and a bypass unit 25.

[Data Control]

The L2 relay unit 24 in the L2 switch IC 52 performs, for example, data filtering which is an example of data control.

More specifically, the L2 relay unit 24 holds, for example, a filter table FTA set by the user. The filter table FTA is specifically an access control list (ACL). The filter table FTA includes a correspondence relation between processing information and specifying information.

Here, the specifying information is, for example, information specifying an Ethernet frame of a filtering target. Specifically, content of the specifying information includes a transmission source MAC address, a transmission destination IP address, a transmission source IP address, a transmission destination port number, a transmission source port number, and the like.

The processing information indicates, for example, content of a process to be performed on the Ethernet frame specified from the corresponding specifying information. The content of the process includes, specifically, discarding of the Ethernet frame, output to the bypass unit 25, and the like.

Upon receiving the Ethernet frame from the switch device 101B or the in-vehicle communication device 111 via the communication port 54, the L2 relay unit 24 checks whether or not the received Ethernet frame is a filtering target on the basis of the specifying information in the filter table FTA.

When the received Ethernet frame is a filtering target, the L2 relay unit 24 performs a process of content indicated by the corresponding processing information on the Ethernet frame.

On the other hand, the L2 relay unit 24 performs, for example, payload checking when the received Ethernet frame is not the filtering target.

More specifically, the L2 relay unit 24 checks whether or not unauthorized data is included in the payload of the received Ethernet frame. Here, unauthorized data is, for example, data including a command for unauthorized access, a virus, or the like.

When the unauthorized data is included in the payload in the received Ethernet frame, the L2 relay unit 24 discards the Ethernet frame.

On the other hand, the L2 relay unit 24 performs the switching process of the layer 2 on the Ethernet frame when the unauthorized data is not included in the payload in the received Ethernet frame.

[Switching Process of Layer 2]

The L2 relay unit 24 can perform the relay process in accordance with, for example, the layer 2, without going through the MPU 51.

The L2 relay unit 24 includes, for example, a plurality of terminals respectively connected to the communication ports 54A, 54B, 54C, and 54D and the bypass unit 25. Each port is allocated a unique logical port number.

In this example, the logical port numbers of the terminals connected to the bypass unit 25 and the communication ports 54A, 54B, 54C, and 54D are #0, #1, #2, #3 and #4, respectively.

Also, the L2 relay unit 24 holds, for example, an address resolution logic (ARL) table.

The content of the ARL table is decided by, for example, the user on the basis of the connection relation fixed in the in-vehicle network as described above.

The ARL table indicates, for example, a correspondence relation between a transmission destination MAC address and an output destination. Here, the output destination is a logical port number.

Specifically, a correspondence relation between the MAC address of the in-vehicle communication device 111 and the logical port number of the terminal having the in-vehicle communication device 111 as a connection destination and a correspondence relation between the MAC address of its switch device 101A and the logical port number of the bypass unit 25 is included in the ARL table.

Upon receiving the Ethernet frame via the communication port 54, the L2 relay unit 24 refers to the transmission destination MAC address included in the received Ethernet frame.

The L2 relay unit 24 acquires the output destination corresponding to the referred transmission destination MAC address from the ARL table, and outputs the received Ethernet frame to the acquired output destination.

Specifically, for example, the L2 relay unit 24 acquires any one of #1 to #4 as the logical port number corresponding to the referred transmission destination MAC address for the Ethernet frame transmitted within the same VLAN as in the Ethernet frame transmitted from the in-vehicle communication device 111B to the in-vehicle communication device 111C.

Then, the L2 relay unit 24 transmits the received Ethernet frame from the terminal of the acquired logical port number to the in-vehicle communication device 111 or the switch device 101B via the communication port 54.

On the other hand, the L2 relay unit 24 acquires #0 as the logical port number corresponding to the referred transmission destination MAC address for the Ethernet frame transmitted between different VLANs as in the Ethernet frame transmitted from the in-vehicle communication device 111B to the in-vehicle communication device 111D.

Then, the L2 relay unit 24 outputs the received Ethernet frame to the bypass unit 25.

Also, upon receiving the Ethernet frame from the bypass unit 25, the L2 relay unit 24 refers to the transmission destination MAC address included in the received Ethernet frame.

The L2 relay unit 24 acquires the output destination corresponding to the referred transmission destination MAC address from the ARL table, and outputs the Ethernet frame received from the bypass unit 25 to the acquired output destination.

[Detection of Abnormality in MPU 51]

The L2 switch IC 52 can detect, for example, an abnormality in the MPU 51. More specifically, the bypass unit 25 in the L2 switch IC 52 is, for example, a sub-microcomputer, and periodically inspects an operation state of the MPU 51.

When the operation state of the MPU 51 is normal, the bypass unit 25 receives the Ethernet frame from the L2 relay unit 24, and outputs the received Ethernet frame to the MPU 51. Here, an operation of the bypass unit 25 when the operation state of the MPU 51 is abnormal will be described later.

[Relay Process of Layer 3]

Referring back to FIG. 3, the MPU 51 performs the relay process via the L2 switch IC 52. Specifically, the MPU 51 performs the relay process in accordance with the layer 3 higher than the layer 2.

The MPU 51 performs the relay process of the layer 3 (hereinafter, also referred to as an L3 relay process) on the Ethernet frame received from the L2 switch IC 52.

Specifically, upon receiving the Ethernet frame from the L2 switch IC 52, the MPU 51 rewrites the transmission destination MAC address and the transmission source MAC address of the received Ethernet frame.

More specifically, for example, the MPU 51 holds the table information TIA indicating the correspondence relation between the IP address and the MAC address used in the relay process of the layer 3.

Specifically, the MPU 51 holds the table information TIA including a routing table indicating the correspondence relation between the transmission destination network which the MPU 51 itself regards the relay target, that is, the VLAN in this example and the VID and an address resolution protocol (ARP) indicating the correspondence relation between the IP address and the MAC address for each VID.

The content of the table information TIA is determined by, for example, the user in advance on the basis of the connection relation fixed in the in-vehicle network as described above.

Upon receiving the Ethernet frame from the L2 switch IC 52, the MPU 51 acquires the transmission destination IP address from the IP packet included in the received Ethernet frame, performs, for example, a subnet mask calculation on the acquired transmission destination IP address, and specifies the transmission destination network.

The MPU 51 specifies the VID corresponding to the specified transmission destination network with reference to the routing table.

Then, the MPU 51 acquires the MAC address corresponding to the transmission destination IP address from the ARP table with reference to the ARP table corresponding to the specified VID.

The MPU 51 rewrites the VID, the transmission destination MAC address, and the transmission source MAC address in the Ethernet frame in the specified VID, the acquired MAC address, and the MAC address of its own switch device 101A, respectively, and then output the rewritten Ethernet to the L2 switch IC 52.

[L3 Relay Process of Specific Example]

Figure 5:
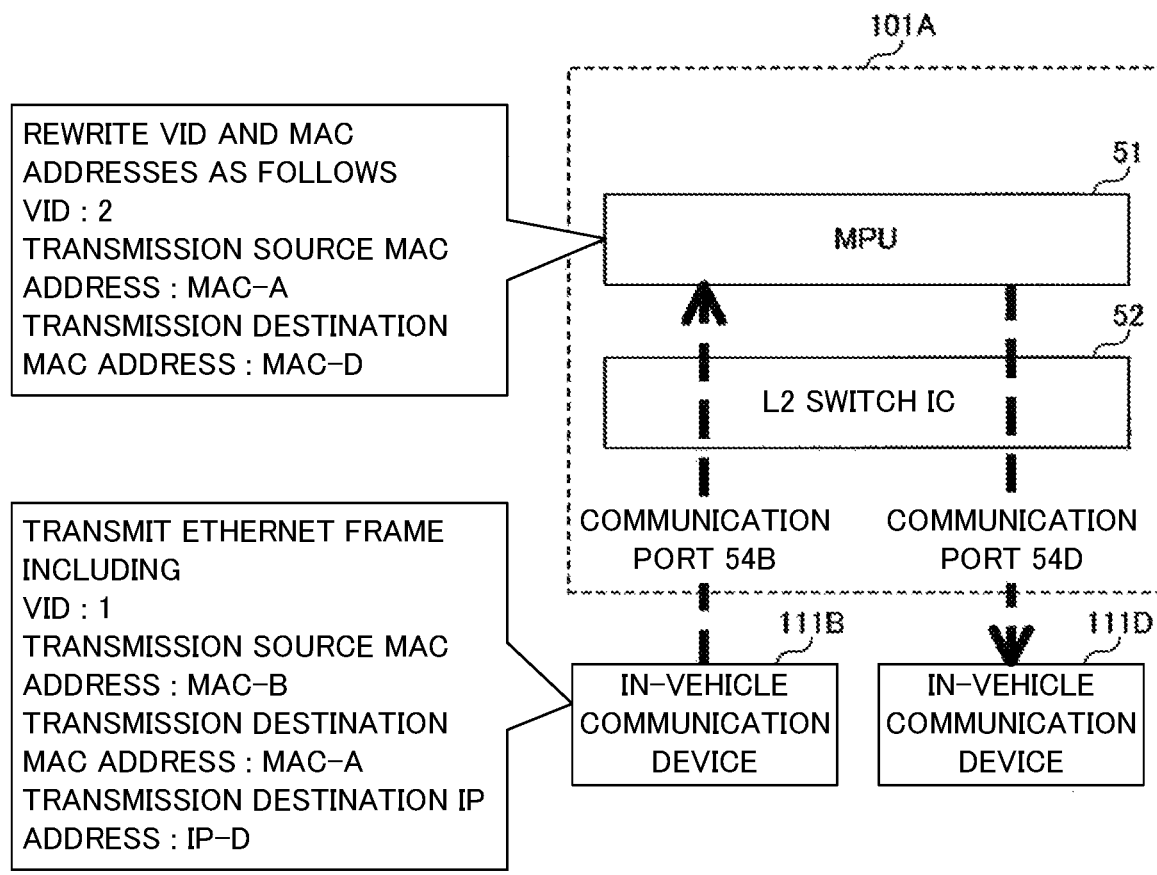
FIG. 5 is a view illustrating an example of a transmission path of an Ethernet frame subjected to an L3 relay process in the in-vehicle communication system according to the first embodiment of the present disclosure.

FIG. 5 is a diagram illustrating an example of a transmission path of an Ethernet frame subjected to the L3 relay process in the in-vehicle communication system according to the first embodiment of the present disclosure.

For example, a situation in which the in-vehicle communication device 111B transmits the Ethernet frame addressed to the in-vehicle communication device 111D is assumed with reference to FIG. 5.

In this case, the in-vehicle communication device 111B transmits the Ethernet frame including "1," MAC-B, MAC-A, and IP-D as the VID, the transmission source MAC address, the transmission destination MAC address, and the transmission destination IP address to the switch device 101A.

Upon receiving the Ethernet frame from the in-vehicle communication device 111B via the communication port 54B and the L2 switch IC 52, the MPU 51 in the switch device 101A performs the L3 relay process on the received Ethernet frame on the basis of the table information TIA.

In a specific example, the MPU 51 rewrites the VID, the transmission source MAC address, and the transmission destination MAC address included in the received Ethernet frame on "2," MAC-A, and MAC-D.

The MPU 51 outputs the Ethernet frame which has been subjected to the L3 relay process to the L2 switch IC 52.

Upon receiving the Ethernet frame from the MPU 51, the L2 switch IC 52 specifies a terminal connected to the communication port 54D as a terminal corresponding to the transmission destination MAC address included in the received Ethernet frame on the basis of the ARL table.

The L2 switch IC 52 transmits the Ethernet frame from the specified terminal. Accordingly, the Ethernet frame is transmitted to the in-vehicle communication device 111D via the communication port 54D.

[When Abnormality in MPU 51 Occurs]

Referring back to FIG. 4, for example, when the abnormality in the MPU 51 is detected, the L2 switch IC 52 transmits predetermined information A1 to the switch device 101B.

More specifically, for example, when an abnormality in the operation state of the MPU 51 is detected, the bypass unit 25 in the L2 switch IC 52 generates a transition request for requesting transition to a restriction mode, includes the generated transition request in the Ethernet frame, and transmits the resulting Ether frame to the switch device 101B via the L2 relay unit 24 and the communication port 54A.

Also, for example, the bypass unit 25 generates notification information indicating that the abnormality has occurred in the MPU 51, includes the generated notification information in the Ethernet frame, and transmits the resulting Ether frame to the in-vehicle communication device 111 such as a navigation devices and an instrument control ECU via the L2 relay unit 24 and the communication port 54.

Upon receiving the Ethernet frame from the switch device 101A, the navigation device and the instrument control ECU acquire the notification information from the received Ethernet frame, display content of the acquired notification information on a display device or an instrument, and notify a driver of the abnormality in the MPU 51.

Accordingly, since the driver can recognize that the abnormality has occurred in the MPU 51, the vehicle 1 can be brought into a maintenance shop or the like to restore the abnormality in the MPU 51 promptly.

[Configuration of Switch Device 101B]

Figure 6:
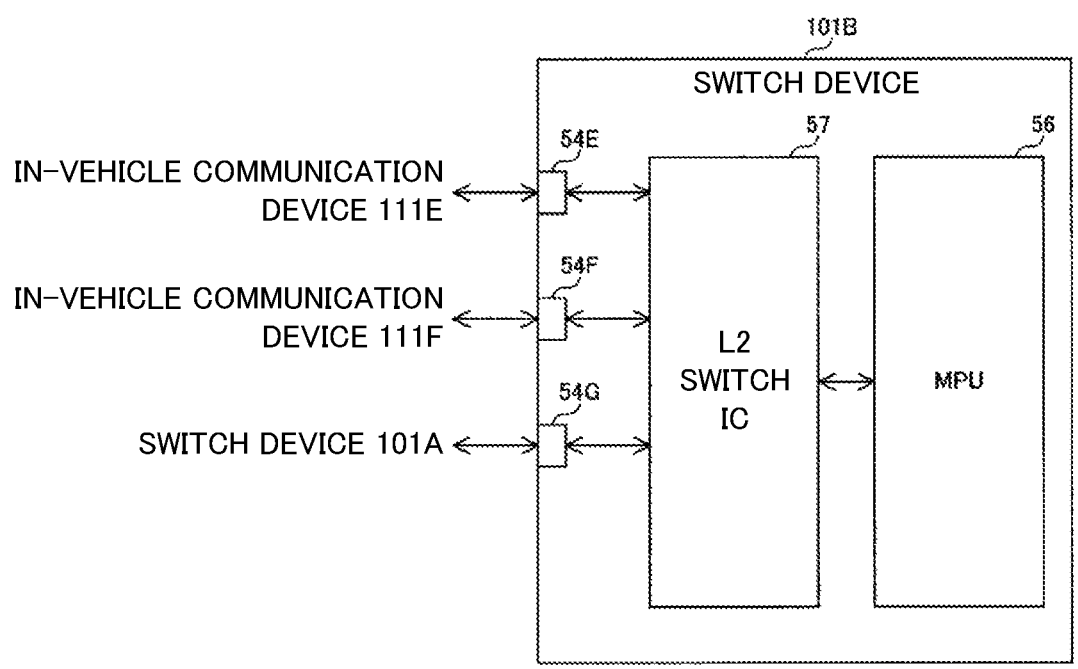
FIG. 6 is a diagram illustrating a configuration of a switch device in the in-vehicle communication system according to the first embodiment of the present disclosure.

FIG. 6 is a diagram illustrating a configuration of the switch device in the in-vehicle communication system according to the first embodiment of the present disclosure.

Referring to FIG. 6, the switch device 101B includes an MPU (processing unit) 56, an L2 switch IC (switch unit) 57, and three communication ports 54.

The switch device 101B is not limited to the configuration in which three communication ports 54 are disposed but may have a configuration in which two, four, or more communication ports 54 are disposed.

In this example, the communication ports 54E, 54F, and 54G are connected to the in-vehicle communication device 111E, the in-vehicle communication device 111F, and the switch device 101A, respectively, via the Ethernet cables.

The switch device 101B operates in any one operation mode of the normal mode and the restriction mode.

More specifically, in the normal mode, the switch device 101B performs the switching process of the layer 2 and the L3 relay process to be performed in itself.

On the other hand, in the restriction mode, in addition to the switching process of the layer 2 and the L3 relay process to be performed in itself, the switch device 101B also performs the L3 relay process to be performed in the switch device 101A.

Figure 7:
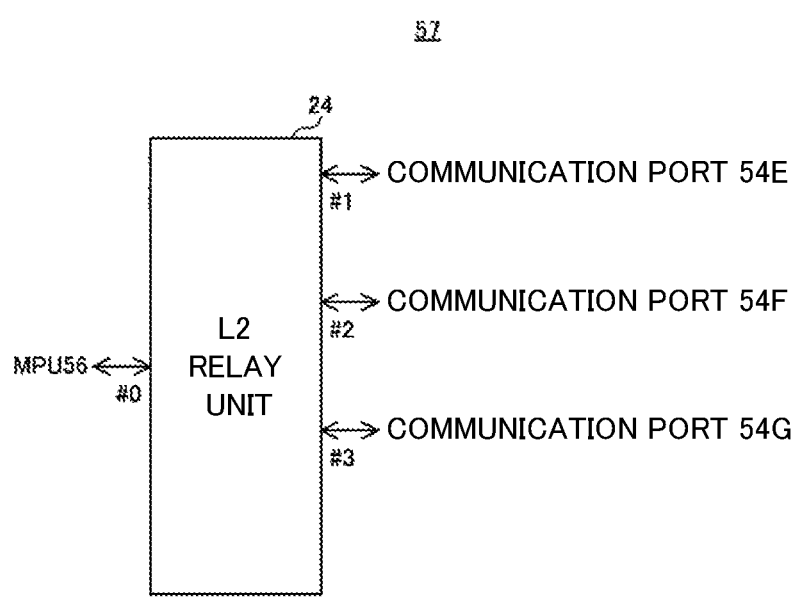
FIG. 7 is a diagram illustrating a configuration of an L2 switch IC in the in-vehicle communication system according to the first embodiment of the present disclosure.

FIG. 7 is a diagram illustrating a configuration of the L2 switch IC in the in-vehicle communication system according to the first embodiment of the present disclosure.

Referring to FIG. 7, the L2 switch IC 57 includes an L2 relay unit 24. Here, unlike the L2 switch IC 52 illustrated in FIG. 4, the L2 switch IC 57 does not include the bypass unit 25.

[Data Control]

The L2 relay unit 24 in the L2 switch IC 57 performs, for example, data filtering which is an example of data control.

More specifically, the L2 relay unit 24 holds, for example, filter tables FTB and FTR set by the user.

The filter table FTB is used in the normal mode. On the other hand, the filter table FTR is used in the restriction mode.

More specifically, the filter table FTB is intended for the Ethernet frame from devices directly connected to its own switch device 101B, that is, the switch device 101A, the in-vehicle communication device 111E, and the in-vehicle communication device 111F.

The filter table FTR has content in which content of the filter table FTA is added to content of the filter table FTB.

In the normal mode, the L2 relay unit 24 performs filtering and payload checking using the filter table FTB on the Ethernet frame received via the communication port 54, and then performs the switching process of the layer 2 on the Ethernet frame.

Further, in the restriction mode, the L2 relay unit 24 performs filtering and payload checking using the filter table FTR on the Ethernet frame received via the communication port 54, and then performs the switching process of the layer 2 on the Ethernet frame.

The filter table to be used by the L2 relay unit 24 is switched by, for example, the MPU 56.

[Switching Process of Layer 2]

The L2 relay unit 24 outputs the Ethernet frame to be subjected to the L3 relay process to the MPU 56.

Further, the L2 relay unit 24 transmits the Ethernet frame on which the switching process of the layer 2 can be performed and the Ethernet frame received from the MPU 56 to the in-vehicle communication device 111 or the switch device 101A via the communication port 54 specified on the basis of the ARL table.

[Relay Process of Layer 3]

Referring back to FIG. 6, the MPU 56 performs the relay process through the L2 switch IC 57. Specifically, the MPU 56 performs the relay process of the layer 3 on the Ethernet frame received from the L2 switch IC 57.

More specifically, for example, the MPU 56 holds table information TIB indicating a correspondence relation between an IP address and a MAC address used in the relay process of layer 3 in its own the switch device 101B and table information TIR indicating a correspondence relation between an IP address and a MAC address used in the relay process of the layer 3 in its own switch device 101B and the switch device 101A.

The table information TIB is used in the normal mode. On the other hand, the table information TIR is used in the restriction mode.

Specifically, the table information TIB includes a routing table indicating a correspondence relation between the transmission destination network which the MPU 56 regards as the relay target, that is, the VLAN and the VID and an ARP table indicating a correspondence relation between an IP address and a MAC address for each VID.

Content of the table information TIB is decided by, for example, the user in advance on the basis of a connection relation fixed in the in-vehicle network as described above.

The table information TIR has content in which content of the table information TIB is added to content of the table information TIA.

The MPU 56 performs the L3 relay process on the Ethernet frame received from the L2 switch IC 57 on the basis of the table information TIB in the normal mode.

In the restriction mode, in addition to the Ethernet frame received from the L2 switch IC 57 in the normal mode, the MPU 56 also receives, from the L2 switch IC 57, the Ethernet frame on which the MPU 51 in the switch device 101A is to perform the L3 relay process. In the restriction mode, the MPU 56 performs the L3 relay process on the Ethernet frame received from the L2 switch IC 57 on the basis of the table information TIR.

[Proxy Process]

The switch device 101B performs a proxy process of relaying the target data received from the L2 switch IC 52 in the switch device 101A instead of the MPU 51. Here, the target data is data received by the switch device 101A from devices other than the switch device 101B, here, data received from the in-vehicle communication devices 111B to 111D and is data to be subjected to the relay process by the MPU 51 in the switch device 101A.

Specifically, for example, the switch device 101B receives the predetermined information A1 from the L2 switch IC 52 and performs the proxy process.

More specifically, for example, upon receiving the Ethernet frame including the transition request from the switch device 101A via the communication port 54G in a state in which the switch device 101B is operating in the normal mode, the L2 switch IC 57 in the switch device 101B outputs the received Ethernet frame to the MPU 56.

Upon receiving the Ethernet frame including the transition request from the L2 switch IC 57, the MPU 56 acquires the transition request from the received Ethernet frame, and causes the operation mode of its own switch device 101B to transition from the normal mode to the restriction mode.

Then, the MPU 56 changes a setting of itself and the L2 switch IC 57 to a setting according to the restriction mode.

Specifically, for example, in the proxy process, the switch device 101B uses second table information instead of first table information.

More specifically, for example, the MPU 56 changes the table information to be used by itself in the L3 relay process from the table information TIB to the table information TIR.

Also, for example, when the proxy device is started, the switch device 101B changes the content of the data control in the relay process from the data control before the proxy process starts. Here, the data control is, for example, data filtering.

Specifically, for example, the MPU 56 changes the filter table to be used when the L2 relay unit 24 in the L2 switch IC 57 performs data filtering from the filter table FTB to the filter table FTR.

Then, the MPU 56 generates a bypass request for requesting the bypass unit 25 in the switch device 101A to bypass the Ethernet frame of the relay process of the layer 3, includes the generated bypass request in the Ethernet frame, and transmits the resulting Ethernet frame to the switch device 101A via the L2 switch IC 57 and the communication port 54G.

[Transmission Rate Restriction Process]

Referring back to FIG. 4, when the abnormality in the MPU 51 is detected, the L2 switch IC 52 in the switch device 101A transmits the target data to the switch device 101B instead of outputting the target data to the MPU 51.

Also, for example, when the abnormality in the MPU 51 is detected, the L2 switch IC 52 restricts the transmission rate of the target data to the switch device 101B.

More specifically, upon receiving the Ethernet frame including the bypass request from the switch device 101B via the communication port 54A, the L2 relay unit 24 in the L2 switch IC 52 outputs the received Ethernet frame to the bypass unit 25.

Upon receiving the Ethernet frame including the bypass request from the L2 relay unit 24, the bypass unit 25 acquires the bypass request from the received Ethernet frame, and recognizes that preparation for the proxy process is completed in the switch device 101B.

The bypass unit 25 outputs a transmission rate restriction command for restricting the transmission rate of data to the communication port 54D connected to the switch device 101B to the L2 relay unit 24.

Upon receiving the transmission rate restriction command from the bypass unit 25, the L2 relay unit 24 sets a data output rate in a terminal with a logical port number of #1 to a restriction rate which is a rate lower than a normal rate.

[Specific Example of Proxy Process]

Figure 8:
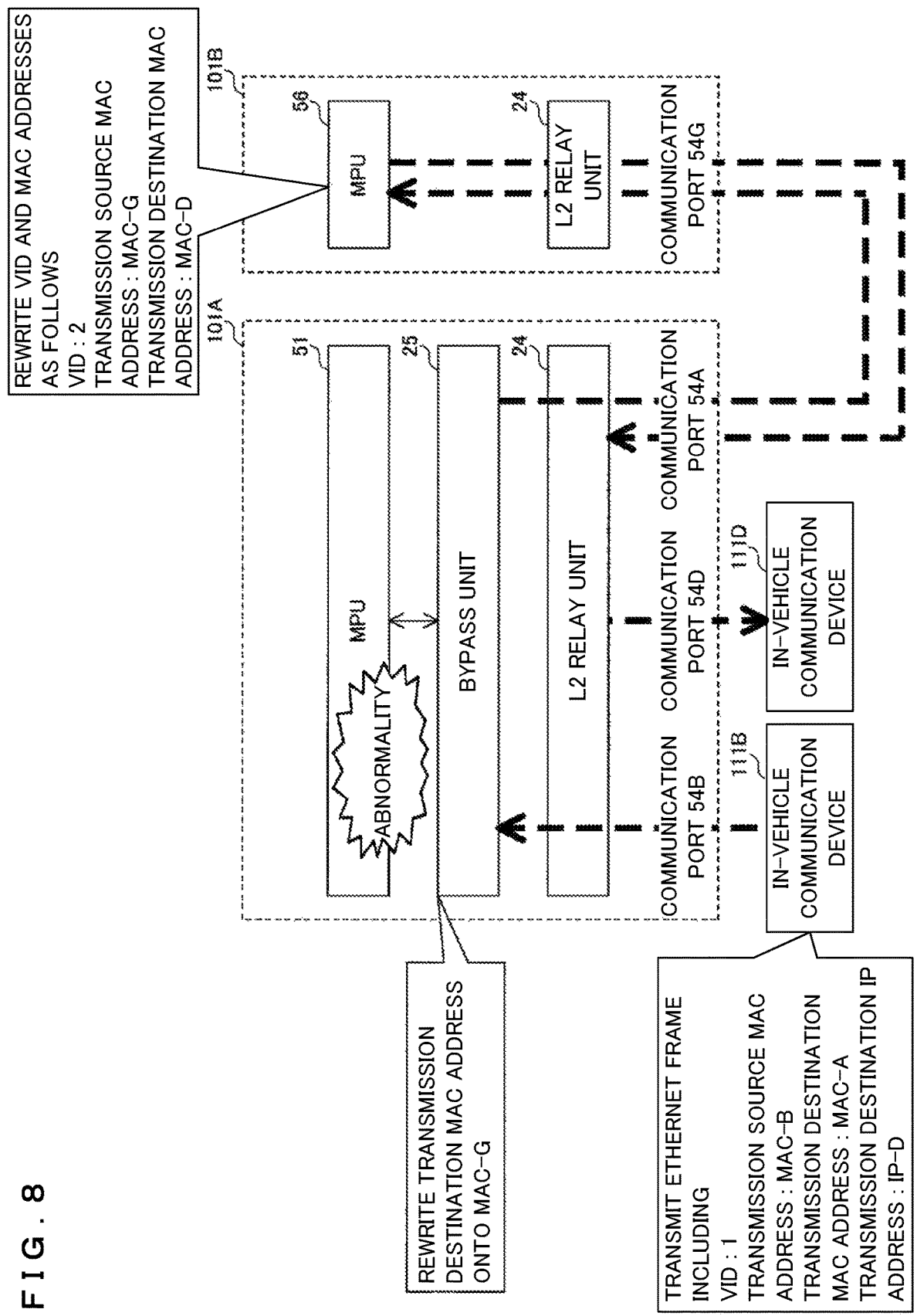
FIG. 8 is a diagram illustrating an example of a transmission path of an Ethernet frame subjected to an L3 relay process in the in-vehicle communication system according to the first embodiment of the present disclosure.

FIG. 8 is a diagram illustrating an example of a transmission path of the Ethernet frame subjected to the L3 relay process in the in-vehicle communication system according to the first embodiment of the present disclosure.

For example, a situation in which the in-vehicle communication device 111B transmits the Ethernet frame addressed to the in-vehicle communication device 111D in a situation in which the MPU 51 in the switch device 101A indicates abnormality is assumed with reference to FIG. 8.

In this case, for example, the in-vehicle communication device 111B transmits the Ethernet frame including "1," MAC-B, MAC-A, and IP-D as the VID, the transmission source MAC address, the transmission destination MAC address, and transmission destination IP address, respectively, to the switch device 101A.

Upon receiving the Ethernet frame from the in-vehicle communication device 111B via the communication port 54B, the L2 relay unit 24 in the switch device 101A outputs the received Ethernet frame to the bypass unit 25 because the received Ethernet frame is the relay process target of the layer 3.

The bypass unit 25 performs the bypass process on the Ethernet frame received from the L2 relay unit 24 after acquiring the bypass request.

Specifically, upon receiving the Ethernet frame from the L2 relay unit 24, the bypass unit 25 rewrites the transmission destination MAC address included in the received Ethernet frame onto MAC-G.

The bypass unit 25 outputs the Ethernet frame with the rewritten transmission destination MAC address to the L2 relay unit 24.

Upon receiving the Ethernet frame from the bypass unit 25, the L2 relay unit 24 specifies a terminal with a logical port number of 1 as a terminal corresponding to the transmission destination MAC address included in the received Ethernet frame on the basis of the ARL table.

Then, the L2 relay unit 24 transmits the Ethernet frame from the specified terminal to the switch device 101B at the restriction rate via the communication port 54A.

For example, because the restriction rate is set in the terminal with the logical port number of 1, the Ethernet frames waiting for transmission may overflow in the transmission buffer. In this case, for example, the Ethernet frames which are unable to be stored in the transmission buffer are discarded.

Upon receiving the Ethernet frame from the switch device 101A via the communication port 54G, the L2 relay unit 24 in the switch device 101B performs filtering of the received Ethernet frame using the filter table FTR because it is in the restriction mode.

Then, after the payload checking is performed, the L2 relay unit 24 outputs the Ethernet frame to the MPU 56 because the Ethernet frame is the relay process target of the layer 3.

Upon receiving the Ethernet frame from the L2 relay unit 24, the MPU 56 performs the L3 relay process on the basis of the table information TIR since it is in the restriction mode.

In the specific example, the MPU 56 rewrites the VID, the transmission source MAC address, and the transmission destination MAC address included in the received Ethernet frame onto "2," MAC-G, and MAC-D, respectively.

The MPU 56 outputs the Ethernet frame subjected to the L3 relay process to the L2 relay unit 24.

Upon receiving the Ethernet frame from the MPU 56, the L2 relay unit 24 specifies a terminal connected to the communication port 54G as a terminal corresponding to the transmission destination MAC address included in the received Ethernet frame on the basis of the ARL table.

The L2 relay unit 24 transmits the Ethernet frame from the specified terminal. Accordingly, the Ethernet frame is transmitted to the switch device 101A via the communication port 54G.

Upon receiving the Ethernet frame from the switch device 101B via the communication port 54A, the L2 relay unit 24 in the switch device 101A specifies a terminal connected to the communication port 54D as a terminal corresponds to the transmission destination MAC address included in the received Ethernet frame on the basis of the ARL table.

The L2 relay unit 24 transmits the Ethernet frame from the specified terminal. Accordingly, the Ethernet frame is transmitted to the in-vehicle communication device 111D via the communication port 54D.

[Flow of Operation]

Each of the devices in the in-vehicle communication system includes a computer, and an operation processing unit such as a CPU in the computer reads a program including some or all of steps in the following sequence diagram or flowchart from a memory (not illustrated) and executes the program. Each of the programs of the plurality of devices can be installed from the outside. Each of the programs of the plurality of devices is distributed in a state in which it is stored in a recording medium.

Figure 9:
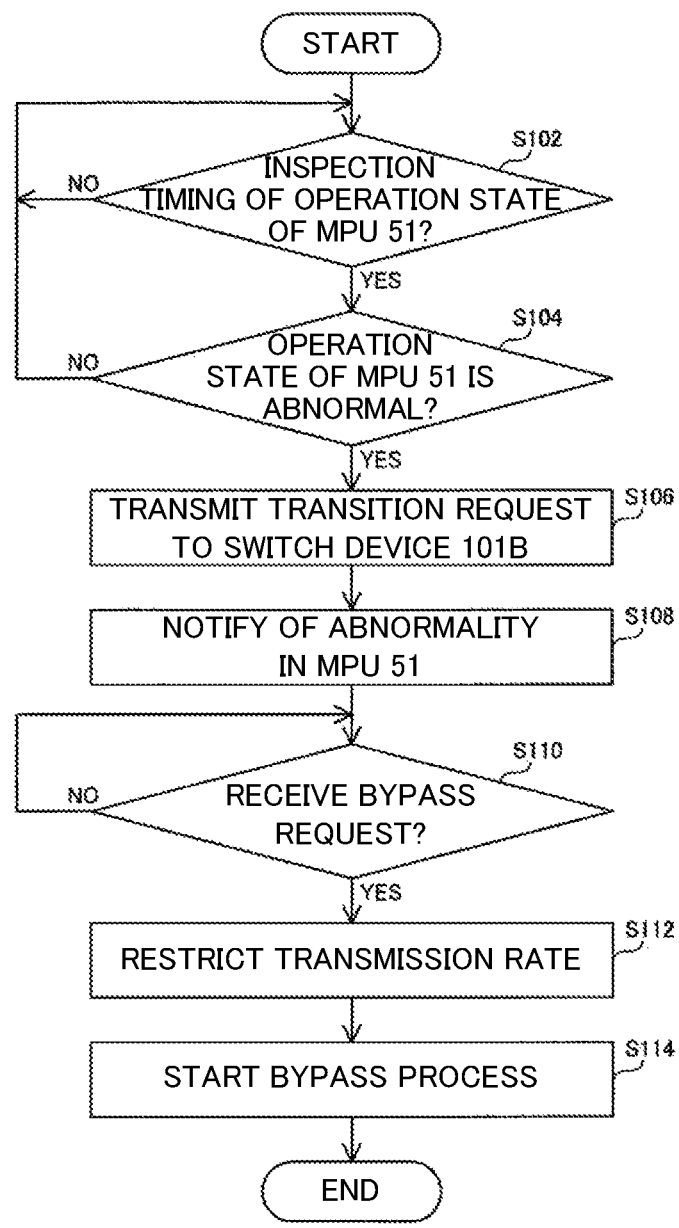
FIG. 9 is a flowchart illustrating an operation procedure when a switch device in the in-vehicle communication system according to the first embodiment of the present disclosure detects an abnormality in an MPU.

FIG. 9 is a flowchart illustrating an operation procedure when the switch device in the in-vehicle communication system according to the first embodiment of the present disclosure detects an abnormality in the MPU. The flow of an operation in the switch device 101A is illustrated in FIG. 9.

Referring to FIG. 9, first, the bypass unit 25 in the switch device 101A is in a standby state for inspection of the operation state of the MPU 51 until a periodic inspection timing of the operation state of the MPU 51 comes (NO in step S102).

Then, the bypass unit 25 checks the operation state of the MPU 51 when the inspection timing comes (YES in step S102) and is in the standby state for the inspection of the operation state of the MPU 51 until a new inspection timing comes (NO in step S102) when the inspection result indicates normal (NO in step S104).

On the other hand, if the inspection result of the operation state of the MPU 51 indicates abnormal (YES in step S104), the bypass unit 25 transmits the Ethernet frame including the transition request to the switch device 101B via the L2 relay unit 24 (step S106).

Then, the bypass unit 25 notifies, for example, to the driver of the abnormality in the MPU 51 (step S108).

Then, the bypass unit 25 is on standby until the Ethernet frame including the bypass request is received from the switch device 101B via the L2 relay unit 24 (NO in step S110).

Then, upon receiving the Ethernet frame including the bypass request from the switch device 101B via the L2 relay unit 24 (YES in step S110), the bypass unit 25 sets a data output rate in the terminal connected to the switch device 101B in the L2 relay unit 24, specifically, the terminal with the port with port number of #1 (see FIG. 4) to a restriction rate (step S112).

Then, each time the Ethernet frame is received from the L2 relay unit 24, the bypass unit 25 rewrites the transmission destination MAC address included in the Ethernet frame onto MAC-G, and starts the bypass process of outputting the Ethernet frame to the L2 relay unit 24 (step S114). The Ethernet frame that has undergone the bypass process is transmitted to the switch device 101B via the communication port 54A.

The order of steps S106 and S108 is not limited to the above example, and the order may be interchanged.

Figure 10:
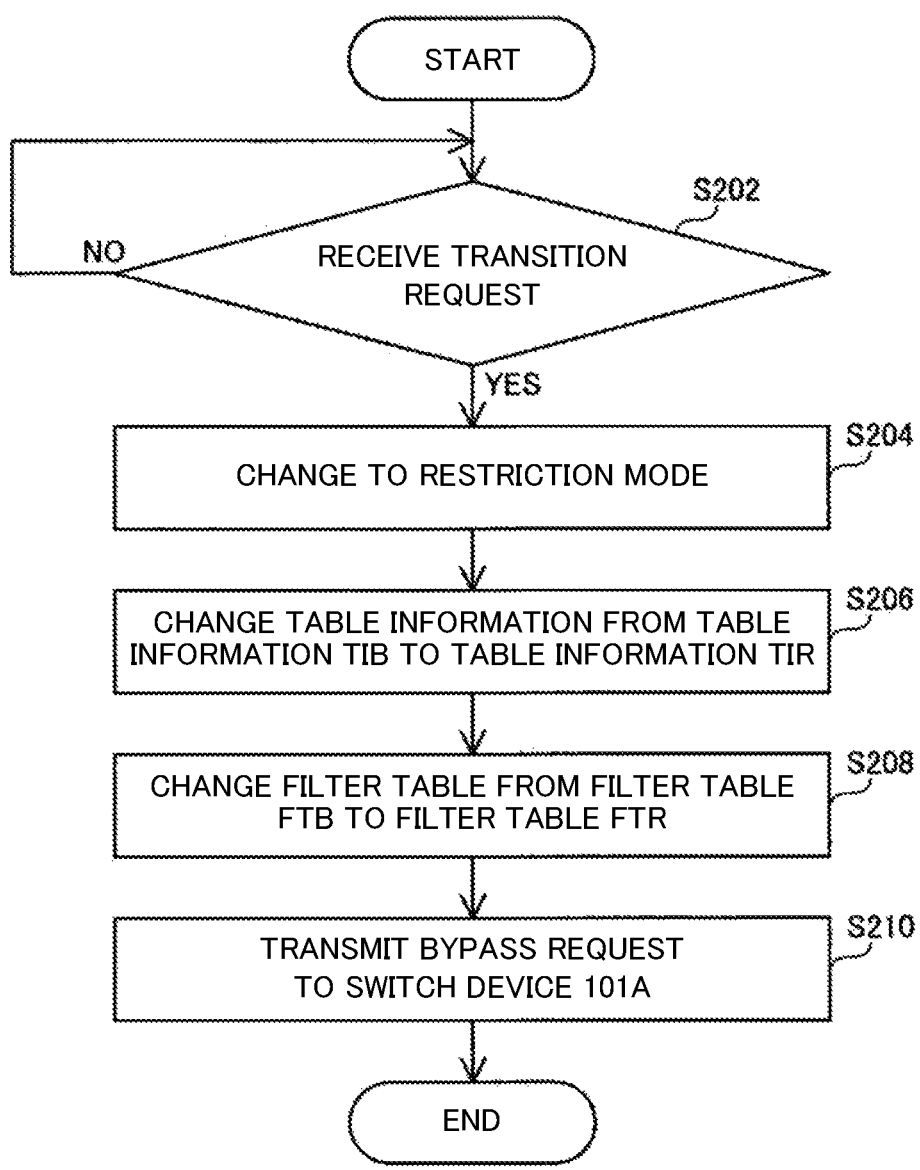
FIG. 10 is a flowchart illustrating an operation procedure when the switch device in the in-vehicle communication system according to the first embodiment of the present disclosure transitions to a restriction mode.

FIG. 10 is a flowchart illustrating an operation procedure when the switch device in the in-vehicle communication system according to the first embodiment of the present disclosure transitions to the restriction mode. The flow of an operation in the switch device 101B is illustrated in FIG. 10.

A situation in which the switch device 101B is operating in the normal mode is assumed with reference to FIG. 10.

First, the MPU 56 in the switch device 101B operates in the normal mode until the Ethernet frame including the transition request is received from the switch device 101A via the L2 switch IC 57 (NO in step S202).

Then, upon receiving the Ethernet frame including the transition request from the switch device 101A via the L2 switch IC 57 (YES in step S202), the MPU 56 causes the operation mode of its own switch device 101B to transition from the normal mode to the restriction mode (step S204).

Then, the MPU 56 changes the table information to be used by itself in the L3 relay process from the table information TIB to the table information TIR (step S206).

Then, the MPU 56 changes the filter table used when the L2 switch IC 57 performs data filtering from the filter table FTB to the filter table FTR (step S208).

Then, the MPU 56 transmits the Ethernet frame including the bypass request to the switch device 101A via the L2 switch IC 57 (step S210).

Accordingly, the MPU 56 completes the preparation for performing the L3 relay process on the Ethernet frame to undergo the L3 relay process performed by the MPU 51 in the switch device 101A in addition to the Ethernet frame received from the L2 switch IC 57 in the normal mode.

The order of steps S206 and S208 is not limited to the above example, and the order may be interchanged.

In the in-vehicle communication system according to the first embodiment of the present disclosure, the switch device 101A includes the MPU 51 and the L2 switch IC 52, and the switch device 101B is configured to include the MPU 56 and the L2 switch IC 57, but the present disclosure is not limited to this example. Each of the switch devices 101A and 101B may be configured to include the MPU 56 and the L2 switch IC 52. With such a configuration, when an abnormality occurs in the MPU 56 in one of the switch devices 101A and 101B, the MPU 56 in which the abnormality is not generated can perform the proxy process, and thus in the in-vehicle communication system 301, more stable data transmission can be realized.

Further, although the in-vehicle communication system according to the first embodiment of the present disclosure is configured to include the two switch devices 101, the present disclosure is not limited to this example. The in-vehicle communication system 301 may be configured to include three or more switch devices 101. In this case, in the in-vehicle communication system 301, one or more switch devices 101A and one or more switch devices 101B may be disposed.

Also, in the switch device according to the first embodiment of the present disclosure, the L2 relay unit 24 is configured to perform filtering and payload checking of data, but the present disclosure is not limited to this example. The MPU 51, the MPU 56, or the bypass unit 25 may be configured to perform at least one of data filtering and payload checking.

In the in-vehicle communication system according to the first embodiment of the present disclosure, the MPU 56 in the switch device 101B is configured to hold the table information TIB and the table information TIR, but the present disclosure is not limited to this example. The MPU 56 may be configured to hold the table information TIR. In this case, the MPU 56 can also perform the L3 relay process in both the normal mode and the restriction mode.

Also, in the in-vehicle communication system according to the first embodiment of the present disclosure, the switch device 101B is configured to change the content of the data control in the relay process from the data control before the proxy process starts when the proxy device is started, but the present disclosure is not limited to this example. The switch device 101B may be configured to maintain the contents of the data control even when the proxy process is started.

In the in-vehicle communication system according to the first embodiment of the present disclosure, the switch device 101B is configured to perform data filtering as the data control, but the present disclosure is not limited to this example. The switch device 101B may be configured to perform other data control.

Also, in the in-vehicle communication system pertaining to the first embodiment of the present disclosure, the L2 relay unit 24 in the switch device 101A is configured to restrict the transmission rate of the target data to the switch device 101B when the abnormality in the MPU 51 is detected, but the present disclosure is not limited to this example. Instead of restricting the transmission rate of the target data by the L2 relay unit 24 in the switch device 101A, the L2 relay unit 24 in the switch device 101B may be configured to restrict the reception rate of the target data from the switch device 101A. Specifically, in the switch device 101B, when its own switch device 101B transitions from the normal mode to the restriction mode, the MPU 56 outputs a reception rate restriction command for restricting the data reception rate in the communication port 54G connected in the switch device 101A to the L2 relay unit 24. Upon receiving the reception rate restriction command from the MPU 56, the L2 relay unit 24 sets the data input rate in the terminal with the logical port number of #3 to the restriction rate which is a rate lower than the normal rate in accordance with the received reception rate restriction command.

By the way, in an in-vehicle network in which a plurality of functional units are disposed, there are cases in which a switch device that relays data which is transmitted and received between the functional units. If the relay circuit that relays data in this switch device has a failure, data relaying between the functional units is not performed normally. Although a technique of performing data transmission in the in-vehicle network more stably due to system redundancy is desirable, such redundancy is not disclosed in Patent Document 1.

On the other hand, the in-vehicle communication system according to the first embodiment of the present disclosure includes the switch device 101A and the switch device 101B that perform the relay process of relaying data in the in-vehicle network. The switch device 101A includes the L2 switch IC 52 and the MPU 51 (processing unit) that performs the relay process via the L2 switch IC 52. When the abnormality in the MPU 51 is detected, instead of outputting, to the MPU 51, the target data which is data received from a device other than the switch device 101B, for example, the in-vehicle communication device 111 and is to undergo the relay process by the MPU 51, the L2 switch IC 52 transmits the target data to the switch device 101B. Then, instead of the MPU 51, the switch device 101B performs the proxy process of relaying the target data received from the L2 switch IC 52.

As described above, for example, with the configuration in which the switch device 101B performs the relay process by proxy in the situation in which the MPU 51 in the switch device 101A has a failure and is unable to perform the relay process via the L2 switch IC 52, it is possible to prevent a situation in which the data is not normally relayed between the in-vehicle communication devices 111 since because the target data is not relayed in the in-vehicle network. Therefore, the more stable data transmission can be realized in the in-vehicle network.

Also, in the in-vehicle communication system according to the first embodiment of the present disclosure, the L2 switch IC 52 can detect the abnormality in the MPU 51, and when the abnormality is detected, the L2 switch IC 52 transmits the predetermined information A1 to the switch device 101B. Then, the switch device 101B receives the predetermined information A1 from the L2 switch IC 52 and performs the proxy process.

As described above, with the configuration in which the L2 switch IC 52 operating in conjunction with the MPU 51 detects the abnormality in the MPU 51, it is possible to detect the abnormality in the MPU 51 more correctly, and thus it is possible to prevent a situation in which the switch device 101B is caused to perform the proxy process even though the MPU 51 is normal.

Also, in the in-vehicle communication system according to the first embodiment of the present disclosure, the switch devices 101A and 101B can perform the relay process in accordance with the layer 2 and the layer 3 higher than the layer 2. The switch device 101B holds the table information TIB indicating the correspondence relation between the IP address and the MAC address used for the relay process of the layer 3 in itself and the table information TIR indicating the correspondence relation between the IP address and the MAC address used for the relay process of the layer 3 in itself and the switch device 101A. Further, the switch device 101B uses the table information TIR instead of the table information TIB in the proxy process.

With the configuration in which the relay process of the layer 3 is performed using the table information TIR prepared in advance when the abnormality in the MPU 51 is detected as described above, the abnormality in the MPU 51 is detected, and thus the relay process of the layer 3 can be started earlier than, for example, in the configuration in which the table information TIR is generated using a predetermined protocol.

Also, in the in-vehicle communication system according to the first embodiment of the present disclosure, when the proxy device is started, the switch device 101B changes the content of the data control in the relay process from the data control before the proxy process starts.

With such a configuration, for example, the switch device 101B can perform the data control to be performed by the switch device 101A by proxy after the abnormality in the MPU 51 is detected.

Also, in the in-vehicle communication system according to the first embodiment of the present disclosure, the above data control is data filtering.

With such a configuration, for example, the switch device 101B can perform the data filtering to be performed by the switch device 101A by proxy after the abnormality in the MPU 51 is detected, and thus unauthorized data can be prevented from being transmitted in the in-vehicle communication system.

Also, in the in-vehicle communication system according to the first embodiment of the present disclosure, the L2 switch IC 52 restricts the transmission rate of the target data to the switch device 101B when the abnormality in the MPU 51 is detected.

With such a configuration, the bit rate of the target data received by the switch device 101B can be lowered, and thus the relay process load in the switch device 101B can be prevented from being excessively increased.

Also, the switch device according to the first embodiment of the present disclosure includes the L2 switch IC 52 and the MPU 51 that performs the relay process via the L2 switch IC 52. When the abnormality in the MPU 51 is detected, instead of outputting, to the MPU 51, the target data which is data received from a device other than another switch device 101, for example, the in-vehicle communication device 111 and is to undergo the relay process by the MPU 51, the L2 switch IC 52 transmits the target data to another switch device 101.

With the configuration in which the target data is transmitted to another switch device 101 instead of outputting the target data to the MPU 51 in a situation in which the MPU 51 has a failure, and the relay process via the L2 switch IC 52 is unable to be performed, it is possible to cause the target data relay process to be performed in another switch device 101 by proxy, and thus it is possible to prevent a situation in which the data is not normally relayed between the in-vehicle communication devices 111 since the target data is not relayed in the in-vehicle network. Therefore, the more stable data transmission can be realized in the in-vehicle network.

Also, the switch device according to the first embodiment of the present disclosure includes the L2 switch IC 57 and the MPU 56 that performs the relay process via the L2 switch IC 57. Further, when the L2 switch IC 57 receives, from another the switch device 101, the target data which is data to undergo the relay process performed by the MPU 51 in which the abnormality is detected in another the switch device 101, the MPU 56 performs the proxy process of relaying the target data received by the L2 switch IC 57 instead of the MPU 51 in another switch device 101.

As described above, for example, with the configuration in which the MPU 51 performs the relay process by proxy instead of the MPU 51 in another switch device 101 in the situation in which the MPU 51 in another switch device 101 has a failure, and the relay process to be performed by the MPU 51 in another switch device 101 is unable to be performed, it is possible to prevent a situation in which the data is not normally relayed between the in-vehicle communication devices 111 since because the target data is not relayed in the in-vehicle network. Therefore, the more stable data transmission can be realized in the in-vehicle network.

Next, another embodiment of the present disclosure will be described with reference to the appended drawings. In the

Second Embodiment

The present embodiment relates to an in-vehicle communication system in which another switch device detects an abnormality in an MPU in a switch device as compared to the in-vehicle communication system according to the first embodiment. Content other than content to be described below are similar to those in the in-vehicle communication system according to the first embodiment.

[Configuration and Basic Operation]

Figure 11:
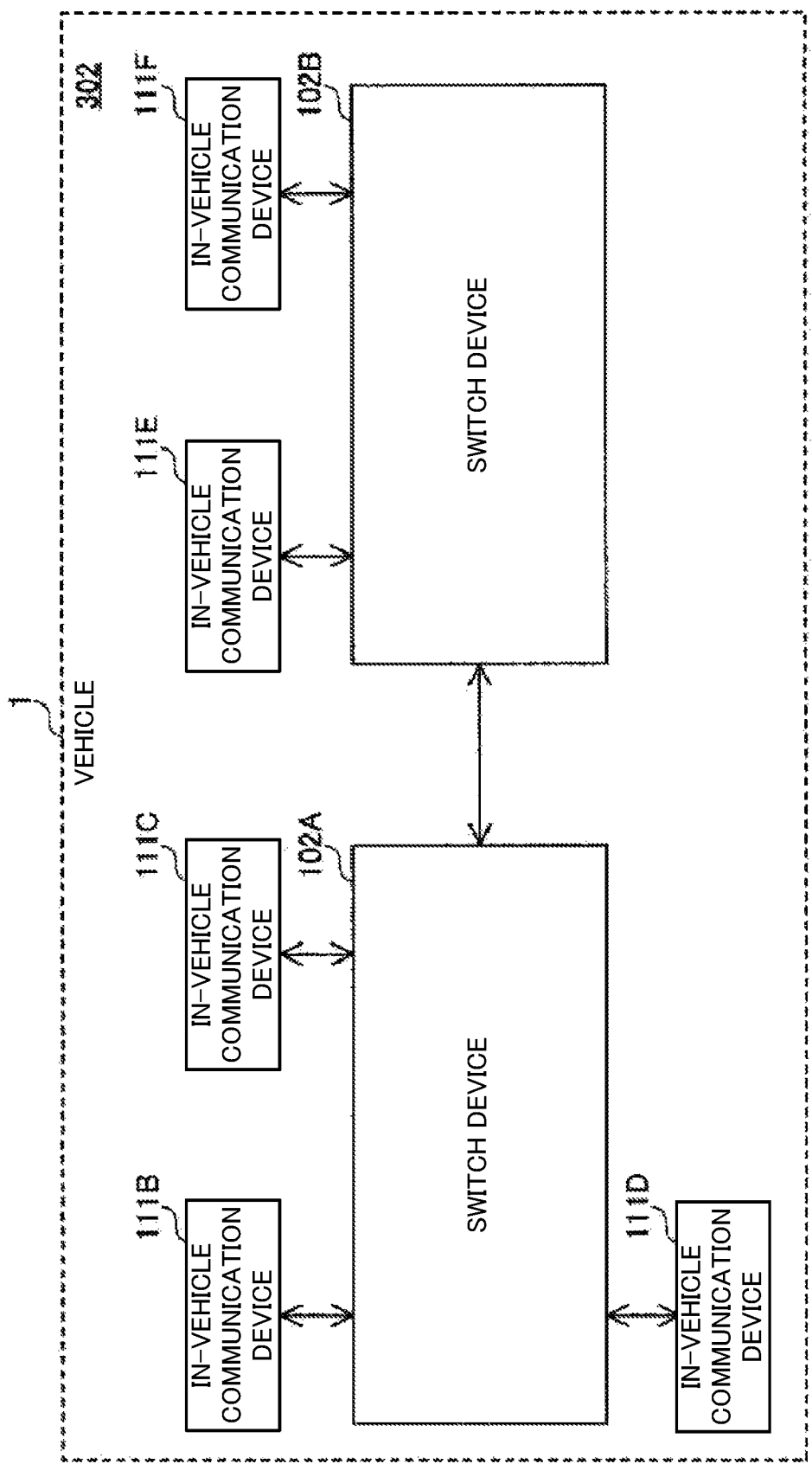
FIG. 11 is a diagram illustrating a configuration of an in-vehicle communication system in accordance with a second embodiment of the present disclosure.

FIG. 11 is a diagram illustrating a configuration of an in-vehicle communication system according to a second embodiment of the present disclosure.

Referring to FIG. 11, an in-vehicle communication system 302 includes a switch device 102A (a first switch device), a switch device 102B (a second switch device), and in-vehicle communication devices 111B, 111C, 111D, 111E, and 111F. The in-vehicle communication system 302 is installed in a vehicle 1.

Hereinafter, each of the switch devices 102A and 102B is also referred to as a switch device 102. The in-vehicle communication system 302 is not limited to the configuration including the five in-vehicle communication devices 111 and may be configured to include two, three, four, six, or more in-vehicle communication devices 111.

Operations of the in-vehicle communication devices 111B, 111C, 111D, 111E, and 111F in the in-vehicle communication system 302 are similar to those of the in-vehicle communication device 111B, 111C, 111D, 111E, and 111F in the in-vehicle communication system 301 illustrated in FIG. 1.

A connection relation of each switch device 102 and each in-vehicle communication device 111 in the in-vehicle network illustrated in FIG. 11 is similar to the connection relation of each switch device 101 and each in-vehicle communication device 111 in the in-vehicle network illustrated in FIG. 1.

A VID, a MAC address, and an IP address of each device in the in-vehicle communication system 302 are similar to the VID, the MAC address, and the IP address of each device in the in-vehicle communication system 301 illustrated in FIG. 1, respectively.

[Configuration of Switch Device 102A]

FIG. 12 is a diagram illustrating a configuration of the switch device in the in-vehicle communication system according to the second embodiment of the present disclosure.

Referring to FIG. 12, the switch device 102A includes an MPU (processing unit) 61, an L2 switch IC (switch unit) 62, and communication ports 54A, 54B, 54C, and 54D.

Operations of the communication ports 54A, 54B, 54C, and 54D in the switch device 102A are similar to those of the communication ports 54A, 54B, 54C, and 54D in the switch device 101A illustrated in FIG. 3, respectively.

Figure 13:
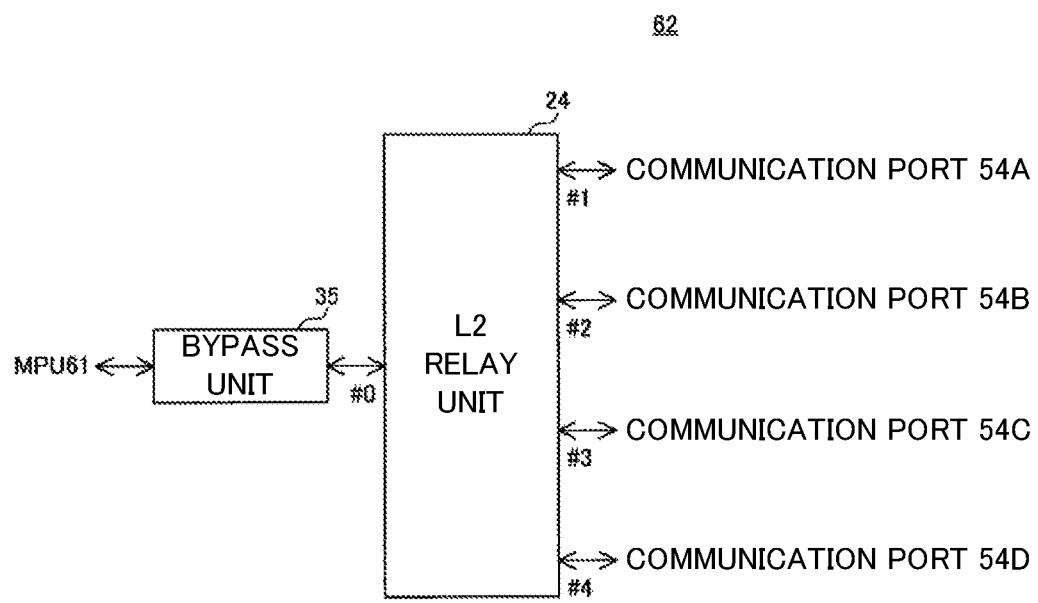
FIG. 13 is a diagram illustrating a configuration of an L2 switch IC in the in-vehicle communication system according to the second embodiment of the present disclosure.

FIG. 13 is a diagram illustrating a configuration of the L2 switch IC in the in-vehicle communication system according to the second embodiment of the present disclosure.

Referring to FIG. 13, the L2 switch IC 62 includes an L2 relay unit 24 and a bypass unit 35.

An operation of the L2 relay unit 24 in the L2 switch IC 62 is similar to that of the L2 relay unit 24 in the L2 switch IC 52 illustrated in FIG. 4.

[Configuration of Switch Device 102B]

FIG. 14 is a diagram illustrating a configuration of the switch device in the in-vehicle communication system according to the second embodiment of the present disclosure.

Referring to FIG. 14, the switch device 102B includes an MPU (processing unit) 66, an L2 switch IC (switch unit) 57, and communication ports 54E, 54F, and 54G.

Operations of the L2 switch IC 57 and the communication ports 54E, 54F, 54G in the switch device 102B are similar to those of the L2 switch IC 57 and the communication ports 54E, 54F, and 54G in the switch device 101B illustrated in FIG. 6.

[Detection of Abnormality in MPU 61]

The switch device 102B can detect the abnormality in the MPU 61 on the basis of, for example, the presence or absence of reception of predetermined response information from the MPU 61.

More specifically, the switch device 102B can operate in one of the normal mode and the restriction mode operation mode.

For example, in the normal mode, the MPU 66 in the switch device 102B periodically generates a health check frame which is an Ethernet frame for checking whether or not the MPU 61 in the switch device 102A is operating normally.

The MPU 66 transmits the generated Ethernet frame to the switch device 102A via the L2 switch IC 57 and the communication port 54G.

Referring back to FIG. 12, upon receiving the health check frame from the switch device 102B via the communication port 54A and the L2 switch IC 62, the MPU 61 in the switch device 102A performs the following process.

That is, the MPU 61 generates an Ethernet frame including response information indicating a response to the receipt of the health check frame, and transmits the generated Ethernet frame to the switch device 102B via the L2 switch IC 62 and the communication port 54A.

Referring back to FIG. 14, when the MPU 66 in the switch device 102B receives the Ethernet frame including the response information from the switch device 102A via the communication port 54G and the L2 switch IC 57, the MPU 66 in the switch device 102B determines that the operation state of the MPU 61 in the switch device 102A is normal.

On the other hand, the MPU 66 determines that the operation state of the MPU 61 is abnormal when the response information to the health check frame is unable to be received until a predetermined timeout period elapses after the health check frame is transmitted.

[Proxy Process]

For example, when the abnormality in the MPU 61 is detected, the switch device 102B transmits predetermined information A2 to the L2 switch IC 62 in the switch device 102A, and performs the proxy process.

More specifically, when it is determined that the MPU 61 in the switch device 102A is abnormal, for example, the MPU 66 in the switch device 102B causes the operation mode of its own switch device 102B to transition from the normal mode to the restriction mode.

Then, the MPU 66 changes the settings of itself and the L2 switch IC 57 to settings according to the restriction mode.

Specifically, the MPU 66 changes, for example, the table information to be used by itself in the L3 relay process from the table information TIB to the table information TIR.

Further, for example, the MPU 56 changes the filter table to be used when the L2 relay unit 24 in the L2 switch IC 57 performs data filtering from the filter table FTB to the filter table FTR.

Then, the MPU 66 generates a bypass request, includes the generated bypass request in the Ethernet frame, and transmits the resulting Ethernet frame to the switch device 102A via the L2 switch IC 57 and the communication port 54G.

Referring back to FIG. 13, upon receiving the Ethernet frame including the bypass request from the switch device 102B via the communication port 54A, the L2 relay unit 24 in the L2 switch IC 62 of the switch device 102A outputs the received Ethernet frame to the bypass unit 35.

Upon receiving the Ethernet frame including the bypass request from the L2 relay unit 24, the bypass unit 35 acquires the bypass request from the received Ethernet frame, and recognizes that the operation state of the MPU 61 is abnormal, and the preparation for the proxy process in the switch device 102B is completed.

The bypass unit 35 outputs a data transmission rate restriction command of data to be transmitted to the communication port 54A connected to the switch device 102B to the L2 relay unit 24.

Also, for example, the bypass unit 35 generates notification information, includes the generated notification information in the Ethernet frame, and transmits the resulting Ethernet frame to the in-vehicle communication device 111 such as a navigation device or an instrument control ECU via the L2 relay unit 24 and the communication port 54.

Further, upon receiving the Ethernet frame from the L2 relay unit 24 after acquiring the bypass request, the bypass unit 25 performs the bypass process on the received Ethernet frame.

Specifically, upon receiving the Ethernet frame from the L2 relay unit 24, the bypass unit 35 rewrites the transmission destination MAC address included in the received Ethernet frame onto MAC-G.

The bypass unit 35 outputs the Ethernet frame in which the transmission destination MAC address has been rewritten to the L2 relay unit 24.

[Flow of Operation]

Figure 15:
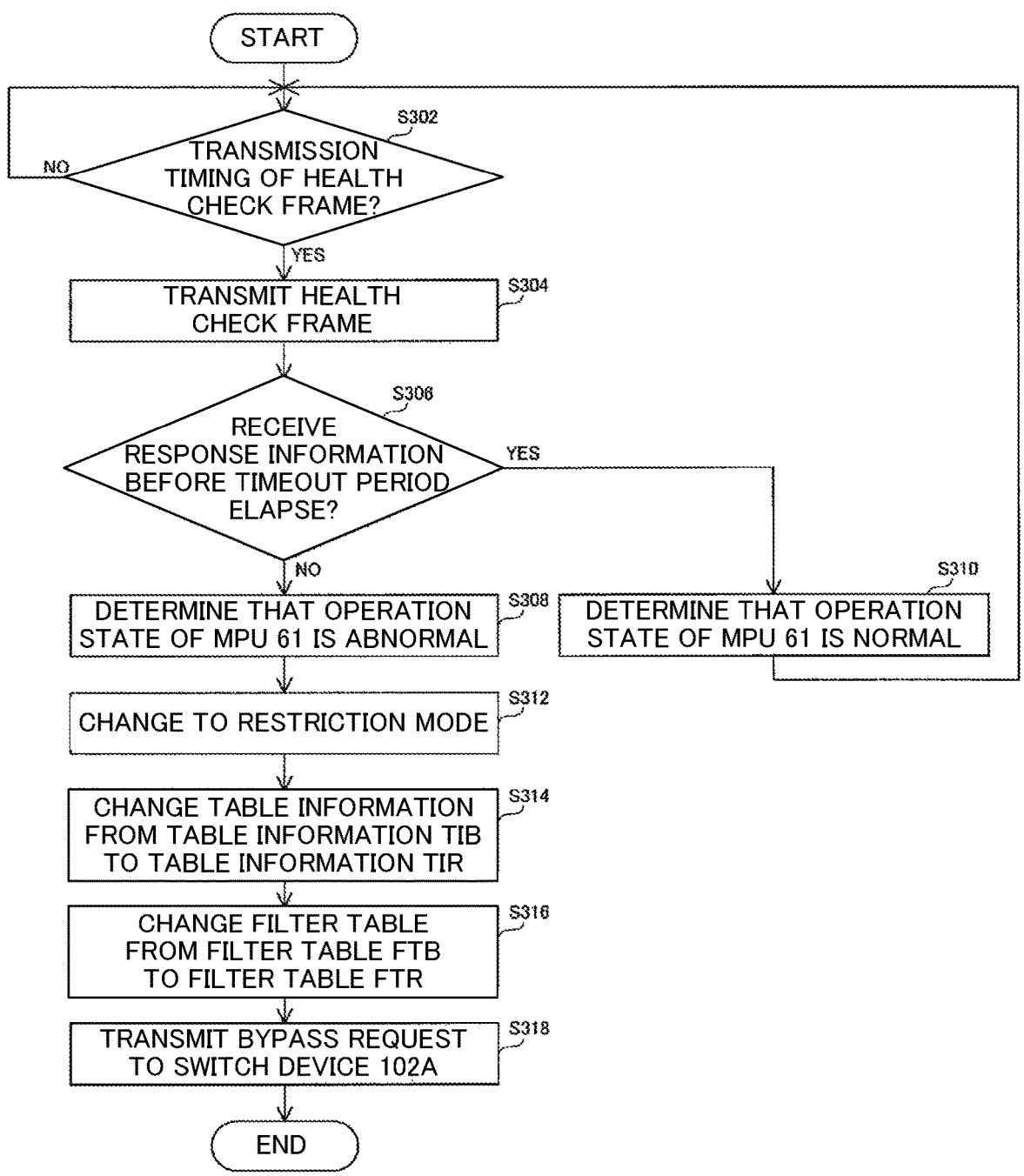
FIG. 15 is a flowchart illustrating an operation procedure when a switch device in the in-vehicle communication system according to the second embodiment of the present disclosure detects an abnormality in an MPU in another switch device.

FIG. 15 is a flowchart illustrating an operation procedure when the switch device in the in-vehicle communication system according to the second embodiment of the present disclosure detects an abnormality in an MPU in another switch device. The flow of an operation in the switch device 102B is illustrated in FIG. 15.

A situation in which the switch device 102B is operating in the normal mode is assumed with reference to FIG. 15.

First, the MPU 66 in the switch device 102B is in a transmission standby state for the health check frame until the periodic transmission timing of the health check frame comes (NO in step S302).

Then, when the periodic transmission timing of the health check frame comes (YES in step S302), the MPU 66 transmits the health check frame to the switch device 102A via the L2 switch IC 57 (step S304).

Then, when the MPU 66 receives response information from the switch device 102A before a timeout period elapses after the health check frame is transmitted (YES in step S306), the MPU 66 determines that the operation state of the MPU 61 in the switch device 102A is normal (step S310).

Then, the MPU 66 is in the transmission standby state of the health check frame until a new transmission timing of the health check frame comes (NO in step S302).

On the other hand, when the MPU 66 did not receive the response information from the switch device 102A until the timeout period elapses after the health check frame is transmitted (NO in step S306), the MPU 66 determines that the operation state of the MPU 61 is abnormal (step S308).

Then, the MPU 66 changes the operation mode of its own switch device 102B from the normal mode to the restriction mode (step S312).

Then, the MPU 66 changes the table information to be used by itself in the L3 relay process from the table information TIB to the table information TIR (step S314).

Then, the MPU 66 changes the filter table to be used when the L2 switch IC 57 performs filtering data from the filter table FTB to the filter table FTR (step S316).

Then, the MPU 66 transmits the Ethernet frame including the bypass request to the switch device 102A via the L2 switch IC 57 (step S318).

Accordingly, the MPU 66 completes the preparation for performing the L3 relay process on the Ethernet frame to undergo the L3 relay process performed by the MPU 61 in the switch device 102A in addition to the Ethernet frame received from the L2 switch IC 57 in the normal mode.

The order of the steps S314 and S316 is not limited to the above example, and the order may be interchanged.

Figure 16:
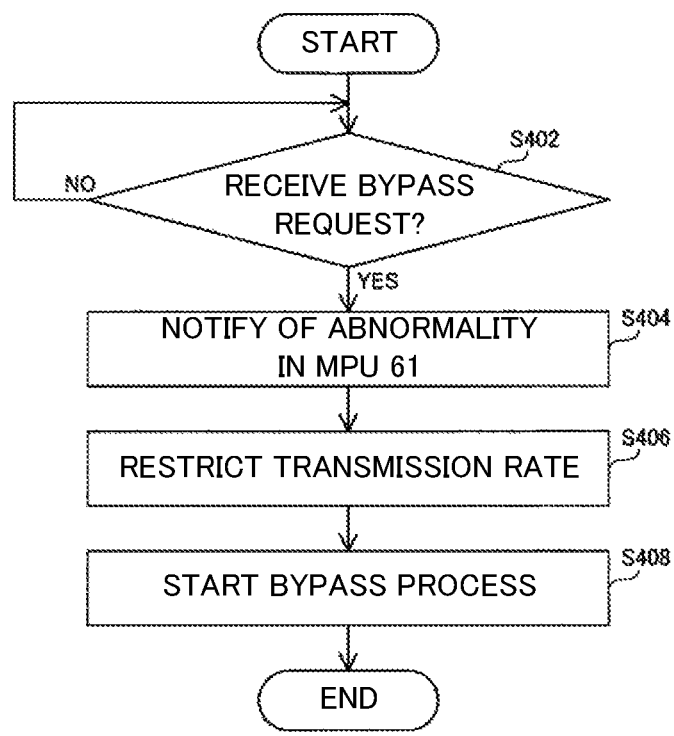
FIG. 16 is a flowchart illustrating an operation procedure when the switch device in the in-vehicle communication system according to the second embodiment of the present disclosure performs a bypass process.

FIG. 16 is a flowchart illustrating an operation procedure when the switch device in the in-vehicle communication system according to the second embodiment of the present disclosure performs the bypass process. The flow of an operation in the switch device 102A is illustrated in FIG. 16.

Referring to FIG. 16, first, the bypass unit 35 in the switch device 102A is in the standby state for the bypass process until the Ethernet frame including the bypass request is received from the switch device 102B via the L2 relay unit 24 (NO in step S402).

Upon receiving the Ethernet frame including the bypass request from the switch device 102B via the L2 relay unit 24 (YES in step S402), When the bypass unit 35 notifies, for example, the driver of the abnormality in the MPU 61 (step S404).

Then, the bypass unit 35 sets the data output rate in the terminal connected to the switch device 102B in the L2 relay unit 24, specifically, the terminal with the logical port number of #1 (see FIG. 4) to the restriction rate (see step S406).

Then, each time the Ethernet frame is received from the L2 relay unit 24, the bypass unit 35 rewrites the transmission destination MAC address included in the Ethernet frame onto MAC-G, and starts the bypass process of outputting the Ethernet frame to the L2 relay unit 24 (step S408). The bypass processed Ethernet frame is transmitted to the switch device 102B via the communication port 54A.

The order of the steps S404 and S406 is not limited to the above example, and the order may be interchanged.

In the in-vehicle communication system according to the second embodiment of the present disclosure, the switch device 102A includes the MPU 61 and the L2 switch IC 62, and the switch device 102B includes the MPU 66 and the L2 switch IC 57, but the present disclosure is not limited to this example. The switch devices 101A and 101B may be configured to include the MPU 66 and the L2 switch IC 62. With such a configuration, when an abnormality occurs in the MPU 66 in any one of the switch devices 102A and 102B, the MPU 66 in which the abnormality does not occur can perform the proxy process, and thus more stable data transmission can be realized in the in-vehicle communication system 302.

Further, although the in-vehicle communication system according to the second embodiment of the present disclosure is configured to include the two switch devices 102, the present disclosure is not limited to this example. The in-vehicle communication system 302 may be configured to include three or more switch devices 102. In this case, in the in-vehicle communication system 302, one or more switch devices 102A and one or more switch devices 102B may be disposed.

Further, in the switch device according to the second embodiment of the present disclosure, the MPU 66 in the switch device 102B is configured to periodically transmit the health check frame to the switch device 102A, but the present disclosure is not limited to this example. For example, the MPU 61 in the switch device 102A may be configured to periodically transmit an alive frame to the switch device 102B, and the MPU 66 may be configured to determine the abnormality in the MPU 61 on the basis of the presence or absence of reception of the alive frame.

As described above, in the in-vehicle communication system according to the second embodiment of the present disclosure, the switch device 102B can detect the abnormality in the MPU 61 on the basis of the presence or absence of reception of predetermined response information or the alive frame from the MPU 61 in the switch device 102A, and when the abnormality is detected, the switch device 102B transmits the predetermined information A2 to the L2 switch IC 62 in the switch device 102, and performs the proxy process.

With such a configuration, the switch device 102B can remotely detect the abnormality in the MPU 61 and perform the proxy process.

The other configurations and operations are similar to those of the in-vehicle communication system according to the first embodiment, and thus detailed description thereof will not be repeated here.

Further, some or all of the components and the operations of the respective devices according to the first and second embodiments of the present disclosure may be combined appropriately.

The above embodiments should be considered as illustrative in all points and not restrictive. The scope of the present invention is illustrated not by the above description but by claims set forth below and are intended to include meaning equivalent to claims set forth below and all modifications within the scope.

The above description includes the features described below.

[Additional Note 1]

An in-vehicle communication system installed in a vehicle, including
first and second switch devices that perform a relay process of relaying data in an in-vehicle network,
the first switch device including
a switch unit, and
a processing unit that performs the relay process via the switch unit,
in which the switch unit transmits target data to the second switch device instead of outputting the target data to the processing unit when an abnormality in the processing unit is detected, the target data being data which is received from a device other than the second switch device and is to undergo the relay process performed by the processing unit,
the second switch device performs a proxy process of relaying the target data received from the switch unit instead of the processing unit,
the first switch device and the second switch device operate in accordance with a communication protocol having a plurality of layers,
the switch unit is able to perform the relay process in accordance with a first layer among the plurality of layers without going through the processing unit,
the processing unit performs the relay process in accordance with a second layer higher than the first layer,
the second switch device performs the proxy process in accordance with the second layer,
the data is an Ethernet frame,
the abnormality is detected by the switch unit or the second switch device, and
the device other than the second switch device is an in-vehicle communication device.

[Additional Note 2]

A switch device in an in-vehicle communication system including a plurality of switch devices performing a relay process of relaying data in an in-vehicle network, including:
a switch unit; and
a processing unit that performs the relay process via the switch unit,
in which the switch unit transmits target data to another switch device instead of outputting the target data to the processing unit when an abnormality in the processing unit is detected, the target data being data which is received from a device other than the other switch device and is to undergo the relay process performed by the processing unit,
the switch device operates in accordance with a communication protocol having a plurality of layers,
the switch unit is able to perform the relay process in accordance with a first layer among the plurality of layers without going through the processing unit,
the processing unit performs the relay process in accordance with a second layer higher than the first layer,
the data is an Ethernet frame,
the abnormality is detected by the switch unit or another switch device, and
the device other than another switch device is an in-vehicle communication device.

[Additional Note 3]

9. A switch device in an in-vehicle communication system including a plurality of switch devices performing a relay process of relaying data in an in-vehicle network, including:
a switch unit; and
a processing unit that performs the relay process via the switch unit,
in which the processing unit performs a proxy process of relaying target data received by the switch unit instead of the processing unit in another switch device when the switch unit receives the target data from the other switch device, the target data being data to undergo the relay process performed by the processing unit in which an abnormality is detected in the other switch device,
the switch device operates in accordance with a communication protocol having a plurality of layers,
the switch unit is able to perform the relay process in accordance with a first layer among the plurality of layers without going through the processing unit,
the processing unit performs the relay process and the proxy process in accordance with a second layer higher than the first layer,
the data is an Ethernet frame, and
the abnormality is detected by another switch device or the processing unit.

It is to be noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

The invention claimed is:

1. An in-vehicle communication system, comprising:
   first and second switch devices that perform a relay process of relaying data in an in-vehicle network,
   the first switch device including
   a switch unit, and
   a processing unit that performs the relay process via the switch unit,
   wherein the switch unit transmits target data to the second switch device instead of outputting the target data to the processing unit when an abnormality in the processing unit is detected, the target data being data which is received from a device other than the second switch device and is to undergo the relay process performed by the processing unit, and
   the second switch device performs a proxy process of relaying the target data received from the switch unit instead of the processing unit.

2. The in-vehicle communication system according to claim 1, wherein the switch unit is able to detect the abnormality in the processing unit, and transmits predetermined information to the second switch device when the abnormality is detected, and
   the second switch device receives the predetermined information from the switch unit and performs the proxy process.

3. The in-vehicle communication system according to claim 1, wherein the second switch device is able to detect the abnormality in the processing unit on the basis of a presence or absence of reception of predetermined information from the processing unit, and transmits a predetermined information to the switch unit and performs the proxy process when the abnormality is detected.

4. The in-vehicle communication system according to claim 1, wherein the first switch device and the second switch device are able to perform the relay process in accordance with a first layer and a second layer higher than the first layer,
   the second switch device holds first table information indicating a correspondence relation between an Internet protocol (IP) address and a media access control (MAC) address used in the relay process of the second layer in the second switch device and second table information indicating a correspondence relation between an IP address and a MAC address used in the relay process of the second layer in the second switch device and the first switch device, and
   the second switch device uses the second table information instead of the first table information in the proxy process.

5. The in-vehicle communication system according to claim 1, wherein, when the proxy process is started, the second switch device changes content of data control in the relay process from data control before the proxy process is started.

6. The in-vehicle communication system according to claim 5, wherein the data control is data filtering.

7. The in-vehicle communication system according to claim 1, wherein the switch unit restricts a transmission rate of the target data to the second switch device when the abnormality in the processing unit is detected.

8. A switch device in an in-vehicle communication system including a plurality of switch devices performing a relay process of relaying data in an in-vehicle network, comprising:
   a switch unit; and
   a processing unit that performs the relay process via the switch unit,
   wherein the switch unit transmits target data to another switch device instead of outputting the target data to the processing unit when an abnormality in the processing unit is detected, the target data being data which is received from a device other than the other switch device and is to undergo the relay process performed by the processing unit.

9. A switch device in an in-vehicle communication system including a plurality of switch devices performing a relay process of relaying data in an in-vehicle network, comprising:
   a switch unit; and
   a processing unit that performs the relay process via the switch unit,
   wherein the processing unit performs a proxy process of relaying target data received by the switch unit instead of the processing unit in another switch device when the switch unit receives the target data from the other switch device, the target data being data to undergo the relay process performed by the processing unit in which an abnormality is detected in the other switch device.

10. A communication control method in an in-vehicle communication system including first and second switch devices that perform a relay process of relaying data in an in-vehicle network,
    the first switch device including
    a switch unit, and
    a processing unit that performs the relay process via the switch unit, the communication control method comprising:
    a step of transmitting, by the switch unit, target data to the second switch device instead of outputting the target data to the processing unit when an abnormality in the processing unit is detected, the target data being data which is received from a device other than the second switch device and is to undergo the relay process performed by the processing unit, and
    a step of performing, by the second switch device, a proxy process of relaying the target data received from the switch unit instead of the processing unit.

11. A communication control method in a switch device in an in-vehicle communication system including a plurality of switch devices performing a relay process of relaying data in an in-vehicle network, each of the switch device including a switch unit and a processing unit, the communication control method comprising:
    a step of performing the relay process via the switch unit; and
    a step of transmitting target data to another switch device instead of outputting the target data to the processing unit when an abnormality in the processing unit is detected, the target data being data which is received from a device other than the other switch device and is to undergo the relay process performed by the processing unit.

12. A communication control method in a switch device in an in-vehicle communication system including a plurality of switch devices performing a relay process of relaying data in an in-vehicle network, each of the switch device including a switch unit and a processing unit, the communication control method comprising:
- a step of performing the relay process via the switch unit; and
- a step of performing a proxy process of relaying target data received by the switch unit instead of the processing unit in another switch device when the switch unit receives the target data from the other switch device, the target data being data to undergo the relay process performed by the processing unit in which an abnormality is detected in the other switch device.

* * * * *